US006927894B2

(12) United States Patent
Blum et al.

(10) Patent No.: US 6,927,894 B2
(45) Date of Patent: Aug. 9, 2005

(54) MIRROR ASSEMBLIES INCORPORATING VARIABLE INDEX OF REFRACTION MATERIALS

(75) Inventors: Ronald D. Blum, Roanoke, VA (US); William Kokonaski, Gig Harbor, WA (US); Dwight P. Duston, Laguna Niguel, CA (US); Youval Katzman, Zichron Yaagov (IL)

(73) Assignee: E-Vision, LLC, Roanoke, VA (US)

( * ) Notice: Subject to any disclaimer, the term of this patent is extended or adjusted under 35 U.S.C. 154(b) by 12 days.

(21) Appl. No.: 10/152,034

(22) Filed: May 22, 2002

(65) Prior Publication Data

US 2003/0007240 A1 Jan. 9, 2003

Related U.S. Application Data

(60) Provisional application No. 60/292,520, filed on May 23, 2001, provisional application No. 60/331,419, filed on Nov. 15, 2001, provisional application No. 60/326,991, filed on Oct. 5, 2001, and provisional application No. 60/346,614, filed on Jan. 10, 2002.

(51) Int. Cl.[7] .............................. G02F 1/29; G02B 5/08
(52) U.S. Cl. ....................................... 359/319; 359/862
(58) Field of Search .................. 359/319, 846, 359/862, 863, 851, 877, 315, 316, 318, 843, 602, 868, 872; 349/57, 113, 195, 200; 701/1–40, 96, 70

(56) References Cited

U.S. PATENT DOCUMENTS

| 3,909,118 A | 9/1975 | Kohashi |
| 4,037,929 A | 7/1977 | Bricot et al. |
| 4,079,368 A | 3/1978 | DiStefano |
| 4,190,327 A | 2/1980 | Hughes |
| 4,299,450 A | 11/1981 | Funada et al. |
| 4,634,835 A | 1/1987 | Suzuki ........................ 219/219 |
| 4,669,825 A | * 6/1987 | Itoh et al. ...................... 345/50 |
| 4,671,615 A | 6/1987 | Fukada et al. .............. 350/331 |
| 4,909,611 A | 3/1990 | Spooner |
| 4,969,103 A | * 11/1990 | Maekawa ..................... 701/96 |
| 5,004,319 A | 4/1991 | Smither |
| 5,071,229 A | 12/1991 | Oaki et al. |
| 5,091,801 A | 2/1992 | Ebstein |
| 5,096,281 A | * 3/1992 | Windebank et al. ........ 359/868 |
| 5,122,888 A | 6/1992 | Iizuka et al. .................. 359/54 |
| 5,124,836 A | 6/1992 | Kikuchi et al. ............. 359/422 |
| 5,204,784 A | * 4/1993 | Spinhirne .................... 359/846 |
| 5,347,402 A | * 9/1994 | Arbogast .................... 359/853 |

(Continued)

FOREIGN PATENT DOCUMENTS

| EP | 0 529 672 | 3/1993 |
| JP | 60-203916 | 10/1985 |
| JP | 62-17093 | 7/1987 |
| JP | 62-170933 | 7/1987 |
| WO | WO 99/25581 | 5/1999 |

OTHER PUBLICATIONS

Thomas et al., "Optimal cascade operation of optical phased–array beam deflectors," Applied Optics, vol. 37, No. 26, Sep. 10, 1998, pp. 6196–6212.

(Continued)

Primary Examiner—Georgia Epps
Assistant Examiner—M. Hasan
(74) Attorney, Agent, or Firm—Kenyon & Kenyon

(57) ABSTRACT

A mirror assembly including an active lens and a reflective surface. The mirror assembly may change its refractive index when a voltage is applied to the active lens, thereby changing the field of view in the lens. Exemplary applications include a blind spot system in a motor vehicle, in which, upon sensing another vehicle in a driver's blind spot, the mirror assembly changes the driver's field of view to include the blind spot. Additional applications include a magnifying mirror for shaving or applying cosmetics.

50 Claims, 14 Drawing Sheets

U.S. PATENT DOCUMENTS

| | | | |
|---|---|---|---|
| 5,443,506 A | | 8/1995 | Garabet |
| 5,447,147 A | | 9/1995 | Stirbl et al. |
| 5,757,562 A | | 5/1998 | Apollonov et al. |
| 5,877,876 A | | 3/1999 | Birdwell ..................... 349/39 |
| 5,978,127 A | | 11/1999 | Berg |
| 6,116,742 A | * | 9/2000 | Ahn ........................... 359/843 |
| 6,437,762 B1 | | 8/2002 | Birdwell ..................... 345/48 |
| 6,437,925 B1 | | 8/2002 | Nishioka ..................... 359/726 |
| 6,464,363 B1 | | 10/2002 | Nishioka et al. ............. 359/846 |
| 6,626,532 B1 | | 9/2003 | Nishioka et al. .............. 351/41 |
| 6,738,199 B2 | | 5/2004 | Nishioka ..................... 359/726 |
| 6,774,871 B2 | | 8/2004 | Birdwell ..................... 345/48 |

OTHER PUBLICATIONS

Salam et al., "DSPs for Real–time Sensing and Control of Automotive Systems," Michigan State University Department of Electrical and Computer Engineering. http://www.ti.com/sc/docs/general/dsp/fest99/digital_control/6dsp_ti99v1.pdf.

"Ford's in–vehicle 'smart' electronics and telematics initiatives," http://media.ford.com/article_display.cfm?article_id=4256, printed Jun. 29, 2001.

Patent Abstracts of Japan, vol. 1996, No. 02, Feb. 29, 1996 & JP 07 251677 A Nissan Motor Co Ltd), Oct. 3, 1995.

"Liquid Crystal Waveplates," http://www.meadowlark.com/catalog/SLMs/appnote.htm.

Anderson, "Adaptive Optics: Liquid Crystals Lower the Cost of Adaptive Optics," Laser Focus World, http://lfw.pennnet.com/Articles.

"Retarders," http://www.meadowlark.com/catalog/Retarders/principles.htm.

Kelly et al., "White–Light Performance of a Polarization–Independent Liquid–Crystal Phase Modulator," Applied Optics, vol. 38, No. 10, Apr. 1, 1999.

Love et al., "Active and Adaptive Optics for the New Generation of Large Telescopes," Current Science, vol. 66, No. 5, Mar. 10, 1994.

* cited by examiner

BACKGROUND

BACKGROUND

MIRROR ASSEMBLIES INCORPORATING VARIABLE INDEX OF REFRACTION MATERIALS

RELATED APPLICATION

This application claims the benefit of U.S. provisional application No. 60/292,520 filed on May 23, 2001; U.S. provisional application No. 60/331,419 filed on Nov. 15, 2001; U.S. provisional application No. 60/326,991 filed Oct. 5, 2001; and U.S. provisional application No. 60/346,614 filed Jan. 10, 2002. Each of these applications is incorporated herein in its entirety.

FIELD OF THE INVENTION

The present invention generally regards focusing mirrors. More specifically the present invention regards focusing mirrors that are variable within a range of different focal lengths.

BACKGROUND

Mirrors are often classified into two categories, focusing and non-focusing. Non-focusing mirrors are typically flat and do not further enlarge or reduce an image being reflected by the mirror. Comparatively, focusing mirrors are generally curved and often enlarge or reduce an image being reflected by the mirror. Depending upon the curvature of the focusing mirror, the position of the object, and the position of the observer of the object, the image viewed by the observer may be enlarged or reduced, may be inverted or upright, and may be real or virtual.

Among the many applications available for focusing mirrors is their use in enlarging the field of view of an observer looking into the mirror. FIGS. 1 and 2 illustrate the basic optics associated with this enlarged field of view. In FIG. 1 the field of view (β) 110 available to the eye 120 of an observer looking into the flat mirror 100 from a distance d. As can be seen, as with all mirrors, the angle of incidence (α) 130 from the rays of an image behind the observer is equal to the angle of reflection (α) 140 of the rays of light being reflected by the mirror 100 to the eye 120 of the observer. The enlarged field of view available to an observer's eye looking into a focusing mirror is demonstrated in FIG. 2, which substitutes a curved convex mirror 200 for the flat mirror 100 of FIG. 1. As can be seen, when comparing FIG. 2 with FIG. 1, the field of view (β) 210 for the observer, as well as the angles (α) of incidence 230 and reflection 240, are greater for the same distance d, when the physically curved mirror 200 is substituted for the flat mirror 100.

SUMMARY OF THE INVENTION

In one embodiment of the present invention a mirror assembly is provided. This assembly includes a non-opaque variable index material, which may be alterable between at least two refractive indices and a reflective surface. This reflective surface may be in optical communication with the variable index material and may be positioned to reflect radiation waves including optically visible light waves passing through the non-opaque variable index material.

In an alternative mirror assembly of the present invention, the assembly may include an optically transmissive container, an active lens, and a variable index material in optical communication with the optically transmissive container. In this embodiment, the variable index material may be alterable between at least two different indices of refraction. This assembly may also include a reflective surface in optical communication with the variable index material and a controller that influences the index of refraction of the variable index material.

Another embodiment of the present invention may include a method for altering a refractive index of a mirror assembly. This method can comprise sensing the presence of an object, generating a signal, and exposing a compound to an electromagnetic field in order to modify the compound's index of refraction.

DETAILED DESCRIPTION

Figure 3:
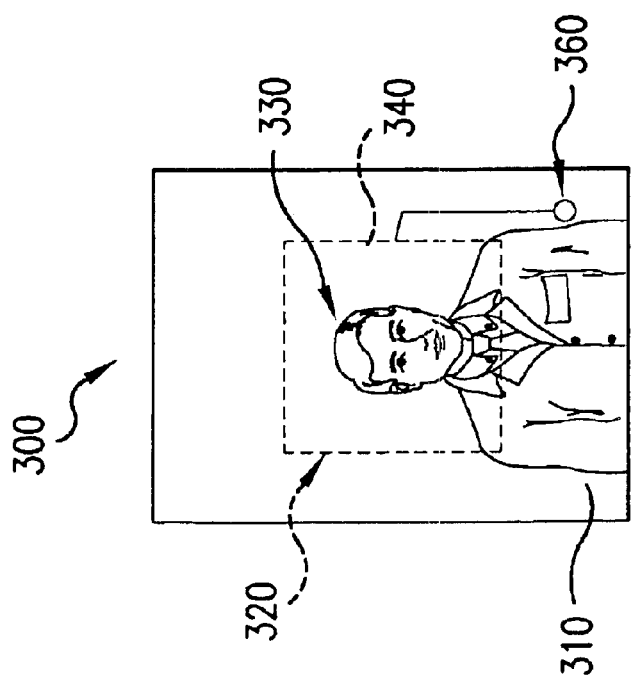
FIG. 3 is a front view of a mirror system in accord with an embodiment of the present invention.

FIG. 3 is a front view of a mirror system 300 in accord with an embodiment of the present invention. This mirror system 300 may include an active zone 320 placed on top of a reflective surface 310. This active zone may include a non-opaque variable index material 340 that may be activated and toggled off and on by switch 360. This non-opaque variable index material 340 may be a liquid crystal material that may, when exposed to a voltage, change its index of refraction such that when light enters the active zone and the non-opaque variable index material 340 is activated, the reflective properties of the reflective surface 310 may be modified. An image 330 consistent with one that may be seen by an observer employing this mirror system 300 is positioned in the active zone 320, as well as in other areas of the reflective surface 310. Because the non-opaque variable index material 340 is alterable between at least two different indexes of refraction, the image reflected by the mirror system 300 may be modified when the non-opaque variable index material's index of refraction is modified.

Figure 1:
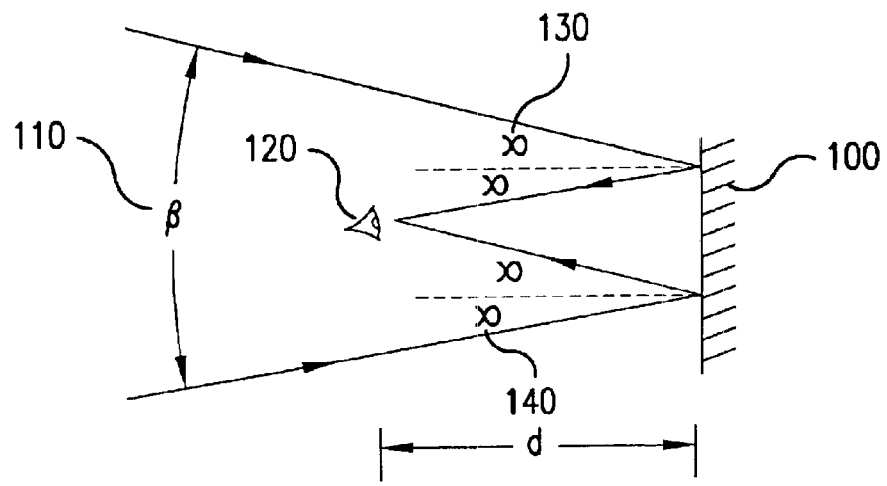
FIG. 1 is a side view of the field of view available to an eye of an observer a certain distance d away from a flat mirror.
Figure 2:
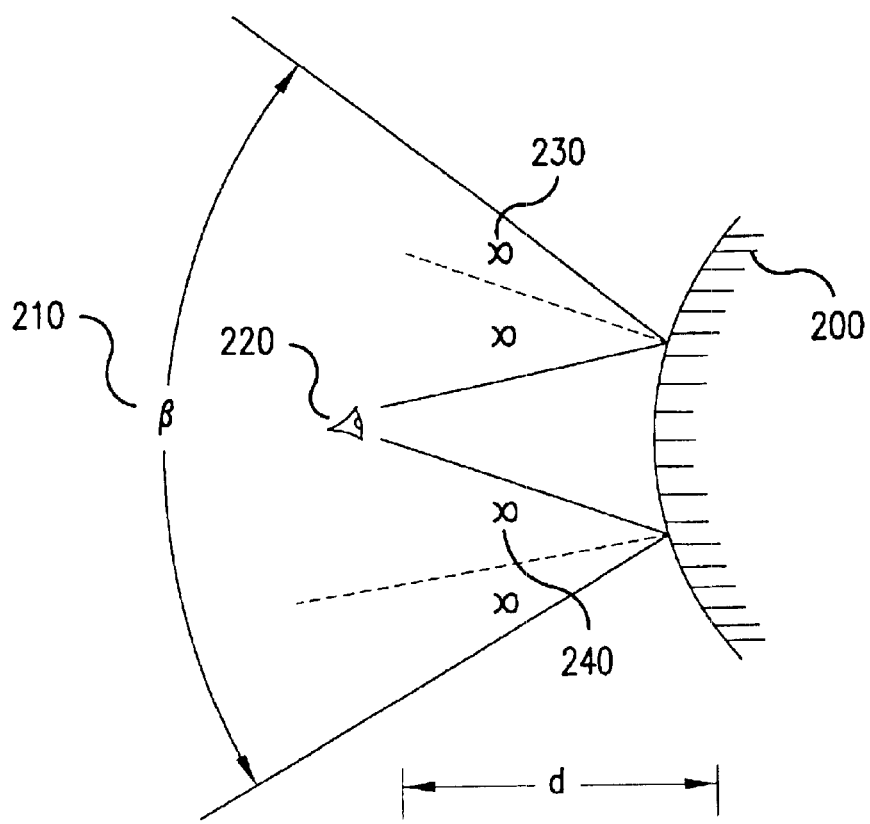
FIG. 2 is a side view of the field of view available to an eye of an observer a certain distance d away from a curved mirror.
Figure 4:
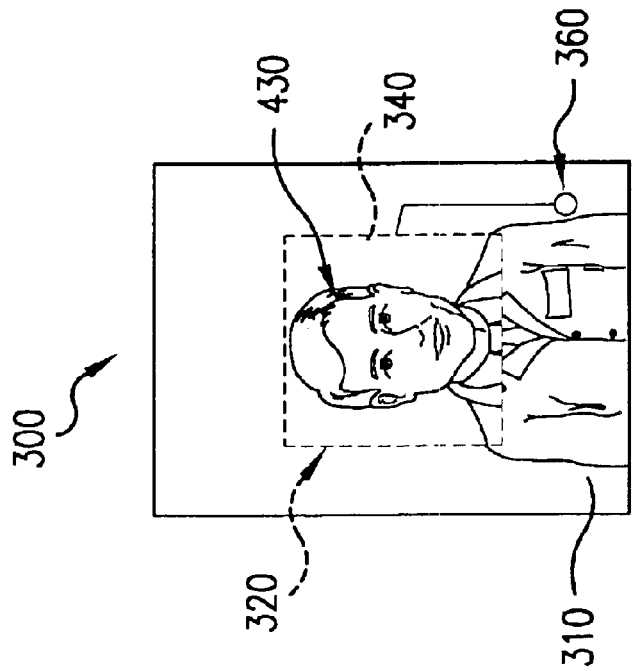
FIG. 4 is a front view of the mirror system from FIG. 3 being employed in accord with an embodiment of the present invention.

FIG. 4 is another front view of the mirror system 300 from FIG. 3. In FIG. 4, the non-opaque variable index material 340, which is positioned in an activation layer within the active zone 320, has been activated. As can be seen, the image 430 within the active zone 320 is enlarged. An observer of the mirror system 300 may now more easily see this enlarged image 430. While in this embodiment an electrical voltage may be used to modify the non-opaque variable index material 340 in the activation layer, other sources of activation may also be used depending upon the variable index material being employed. For instance, a certain variable index material may be used whose index of refraction may be modified through thermal energy. Moreover, other variable index materials may be employed whose index of refraction may be modified through radiation stimulus in both the visual and non-visual frequency ranges, as well as through various chemical reactions that may cause the variable index material to change its index of refraction such that the reflective properties of the reflective surface 310 of the mirror 300 may be modified in the area of the active zone 320 during the introduction of these activation agents.

Figure 5:
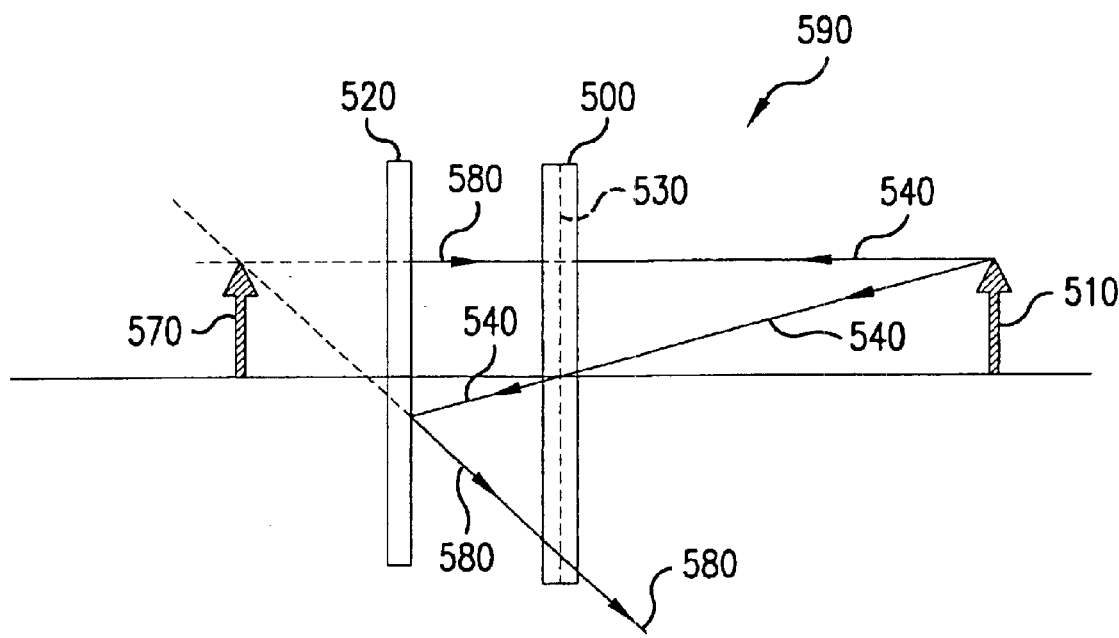
FIG. 5 is a side view of a mirror assembly in a passive state in accord with an alternative embodiment of the present invention.

FIG. 5 is a side view of a mirror assembly 590 as may be employed in an alternative embodiment of the present invention. This mirror assembly 590 is shown with both the reflective surface 520 and an active lens 500. The active lens 500 is comprised of a non-opaque variable index material 530 contained within a substrate and a superstrate. With the reflective surface 520 and the lens 500 in close proximity, light reflected from an object 510 passes through the lens 500, is then reflected by the reflective surface 520, and finally again passes through the lens 500 to produce an image 570.

As can be seen in this figure, when the non-opaque variable index material 530 is not activated, the active lens 500 has no optical power. Thus, light may be reflected from the object 510 to create the image 570; light rays, depicted with points 580 and 540, may travel straight through the non-opaque variable index material 530 without being refracted in either direction.

The lens 500, in this embodiment, may be chosen from a broad range of optically transmissive containers including glass, plastic or other materials that are able to transmit or conduct light waves. It is preferable that the optically transmissive containers be as clear as possible although opaque containers may be used in certain applications. Likewise, the non-opaque variable index material 530 may be chosen from various variable index materials that are capable of modifying or having their index of refraction modified when a stimulus is applied to them. In each case it is preferable, however, that the non-opaque variable index material be able to transmit light such that it is either translucent or transparent to light rays passing through it.

Figure 6:
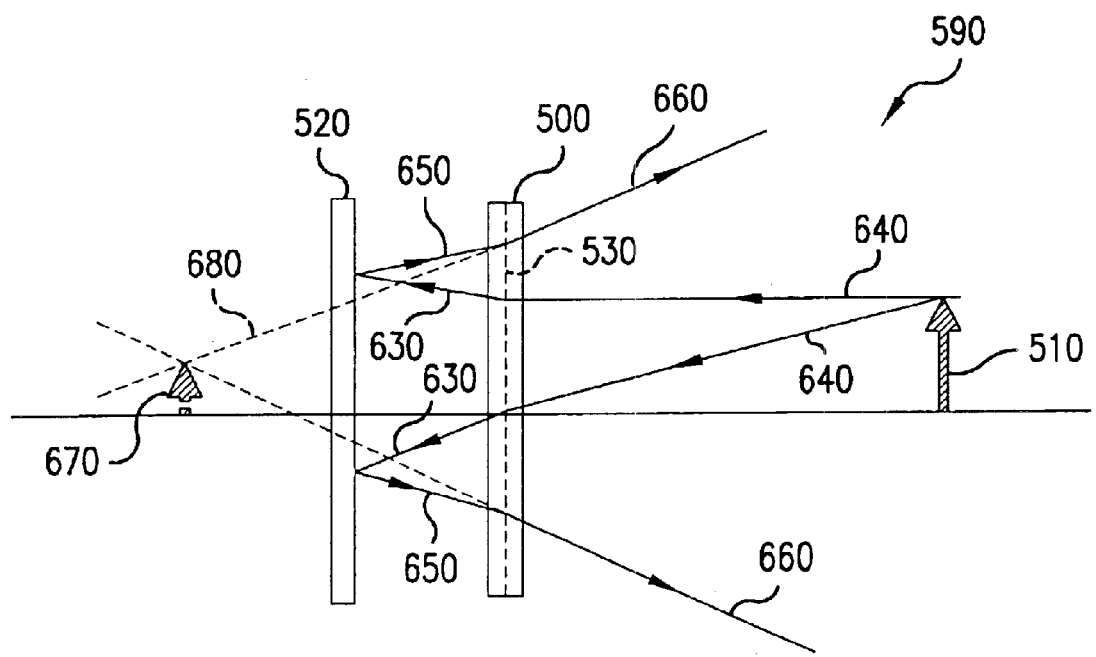
FIG. 6 is a side view of the same mirror assembly from FIG. 5, this time in an active state in accord with an alternative embodiment of the present invention.

FIG. 6 is a side view of the mirror assembly 590 from FIG. 5, this time with the non-opaque variable index material 530 being placed in an active state such that its index of refraction is altered, yielding an electroactive lens 500 with non-zero optical power. As a result of this difference in index of refraction, and as illustrated in FIG. 6, rays of light 630, 640, 650, and 660 passing through the lens 500 and through the non-opaque variable index material 530 are refracted and bent from their original line of travel. As a consequence, the reflected image 670 seen on reflective surface 520 is smaller than the image 570 seen in FIG. 5 even though the object 510 in FIG. 6 is the same size as the object 510 in FIG. 5. Consequently, by modifying the non-opaque variable index material 530 through the use of a stimulus such as a voltage potential, a chemical stimulus or a thermal stimulus, the magnification power of the mirror assembly 590 can be temporarily modified as necessary.

In FIG. 6, the variable index material 530 de-magnifies the object 510 as a divergent lens does. Alternatively, the variable index material 530 may act as a convergent lens and magnify the object 510 such that the object 510 is larger than the image 570 seen in FIG. 5.

The location and placement of the variable index region in the lens with respect to the reflective surface may depend on the variable index region's overall size. For variable index zones that occupy a space within the lens smaller than the reflective surface, the variable index region may be placed within the lens such that the compound is near the center of the reflective surface. Conversely, for variable index regions occupying a larger space within the lens, the reflective surface may be centered in relation to the variable index region. Moreover, the variable index region may be centered near an edge of the reflective surface rather than in its center as discussed above.

Figure 7:
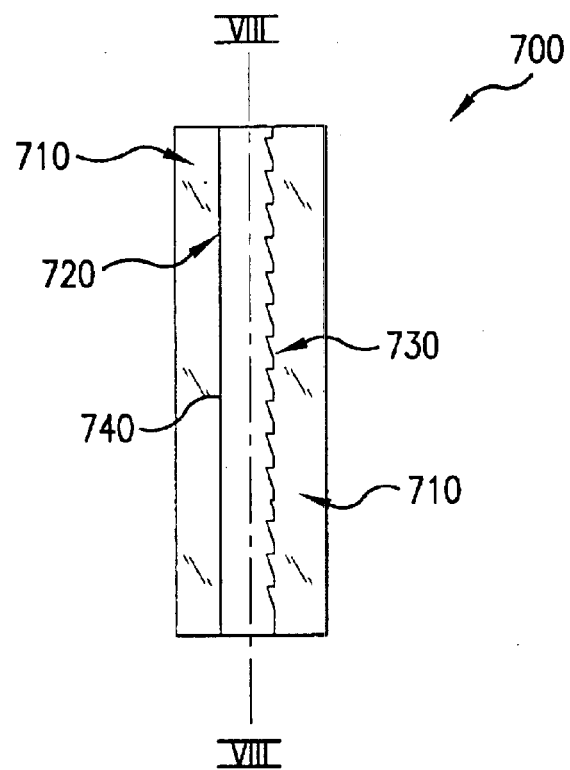
FIG. 7 is a side cross-sectional view of an active mirror assembly in accord with another alternative embodiment of the present invention.

FIG. 7 is an enlarged cross-sectional view of an active lens 700 according to another embodiment of the present invention. This lens 700 has two panels of glass, plastic, or other transparent material 710, one with a flat face 720 and one with a diffractive patterned, cross-sectional face 730 which emulates a Fresnel lens. These two faces define a void filled by variable index material 740. In this embodiment, electrodes (not shown) may be deposited on the face of each glass panel 710 adjacent to the variable index material 740. By adjusting the voltage applied to these electrodes, the index of refraction of the variable index material 740 may be increased or decreased and may be selectively modified such that its refractive index can be matched to the index of the Fresnel lens etched into the glass panels, yielding an active lens with no optical power. Thus, in a power-on state the optical power of the lens 700 would be zero and in the power-off state the optical power of the lens 700 would equal the power of Fresnel lens etched into the panel 710. Alternatively, the power-on state may provide a power as well or even a prism function as described below.

The panels 710 may also be made of plastic or any other non-opaque material through which light may be transmitted. Additionally, the face 730 may have either a diverging or converging diffractive Fresnel pattern according to the desired application.

Figure 8:
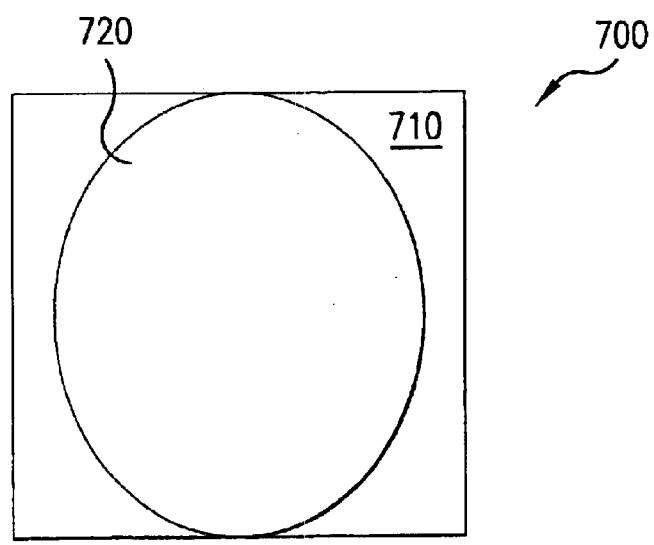
FIG. 8 is a cross-sectional view along line VIII—VIII of FIG. 7.

FIG. 8 is a frontal view along line VIII—VIII of FIG. 7. As can be seen in FIG. 8, the variable index material 720 has a circular profile on the glass 710 of the active lens 700 in this embodiment, although other shapes are also plausible. Likewise, the glass 710 is not limited to the square shape in this embodiment, but may be circular, elliptical, or any geometric shape according to the application.

As discussed above, patterned surface 730 of the glass 710 may be designed such that light entering or passing through the lens 700 is effected by the patterned face 730, depending on the state of the variable index material. Therefore, in order to achieve the desired focusing and light modifying characteristics, both the fixed components, such as the patterned face 730 and the variable components such as the refractive index of the variable index material 720, can be considered and designed to work together to achieve the desired results.

Figure 9:
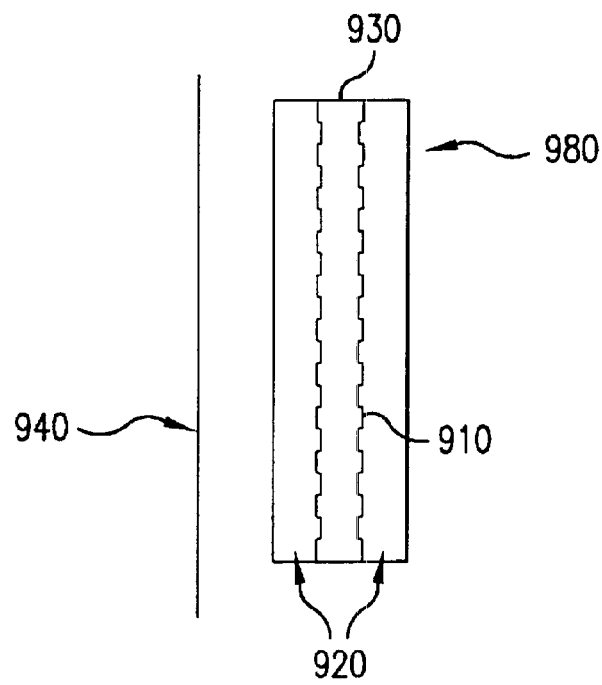
FIG. 9 is a side cross-sectional view of a mirror assembly employing an activation layer in accord with another alternative embodiment of the present invention.

FIG. 9 is a side cross-sectional view of an active lens 980 of a mirror assembly employing electrically conductive concentric loops 910 between two layers of glass 920, both of which surround a non-opaque variable index material 930. In this embodiment each loop 910 has its own set of electrodes (not shown) deposited on the faces of the layers 920 facing the variable index material 930. Each loop 910 and each of its electrodes may be electrically addressed with a distinct voltage, thereby creating a unique electric field across the variable index material 930 associated with that voltage. By selectively applying voltages to these electrical concentric loops 910, the non-opaque variable index material 930 may be selectively activated such that light passing through the active lens 980 and reflected by the mirror face 940 can be modified. This selective activation may be done to achieve the desired magnification or demagnification of an image being reflected by the mirror assembly. The center portion of the variable index material 930 of the activation layer may have a higher degree of magnification or demagnification than the outer portions of the activation layer in one embodiment of the present invention. Alternatively, the exact opposite, as well as other variations, may also be employed.

Alternatively a variable or stepped voltage may be provided to the variable index material in order to provide a fuller range of demagnification power and field of view. The variable or stepped voltage could be supplied by adding intermediate voltage arrays to power the variable index material continuously or in steps between zero and full-on voltages. This can be incorporated within software that drives the electronics, and can also be provided to the user as a switching option having intermittent and variable timing activation periods.

The glass layers 920 may also be, in alternative embodiments, plastic or any other non-opaque material for transmitting light. Additionally, by varying the voltage applied to the loops 910 either converging or diverging refractive power may be created by the variable index material 930.

Figure 10A:
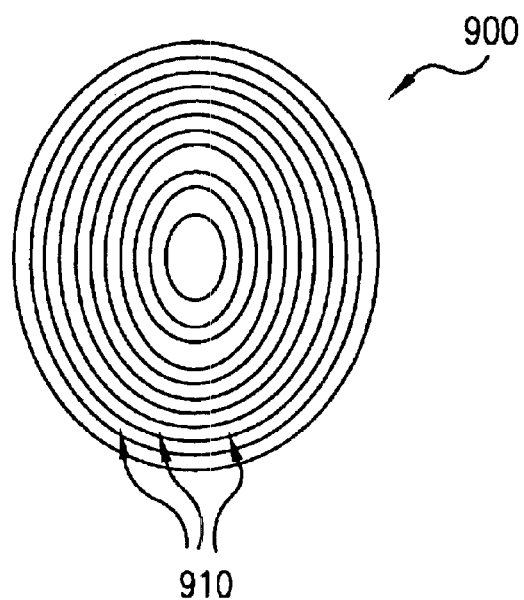
FIGS. 10A, 10B, and 10C are front plan views of the activation layers that may be employed in an active mirror system in accord with another alternative embodiment of the present invention.

FIG. 10A is a front view of an activation layer 900, that includes the electrically conductive concentric loops 910 shown in FIG. 9 for passing an electric field to the variable index material in accord with another alternative embodiment of the present invention. The loops 910 in this embodiment may be used as an alternative to or an addition to the diffractive patterned face 730 of FIG. 7. Here, the loops 910 have an array of voltages applied to them generating an electric field across the variable index material to create a diffractive effect; whereas, the patterned face 730 of FIG. 7 creates the diffractive effect. An electric circuit that may be used to drive the activation layer 900 may include a flying capacitor circuit or any other circuit capable of producing voltage that may be applied to the variable index material.

Figure 10B:
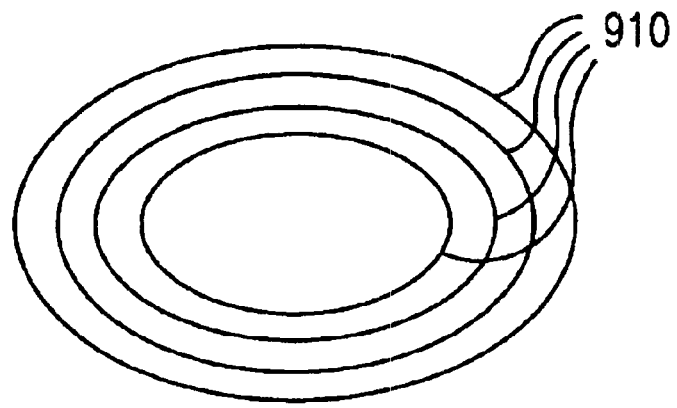
Figure 10C:
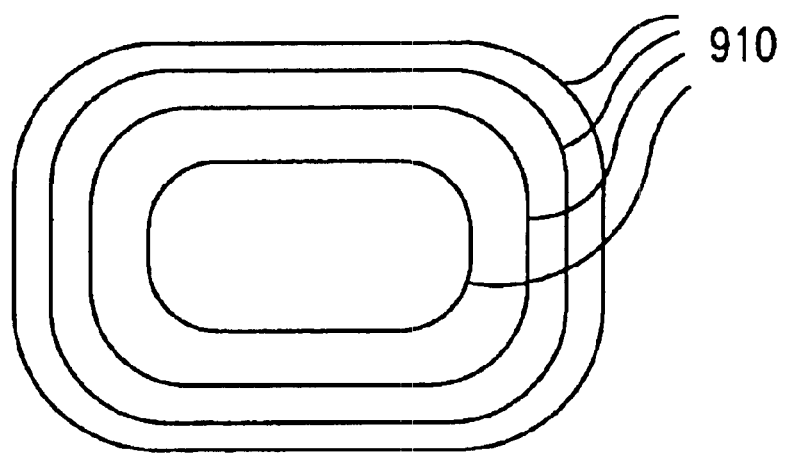

FIGS. 10B and 10C are similar to FIG. 10A except that rather than having the loops 910 positioned in vertical concentric circles the loops 910 are configured in other patterns. The number and shape of the loops may vary depending on the application.

Figure 11:
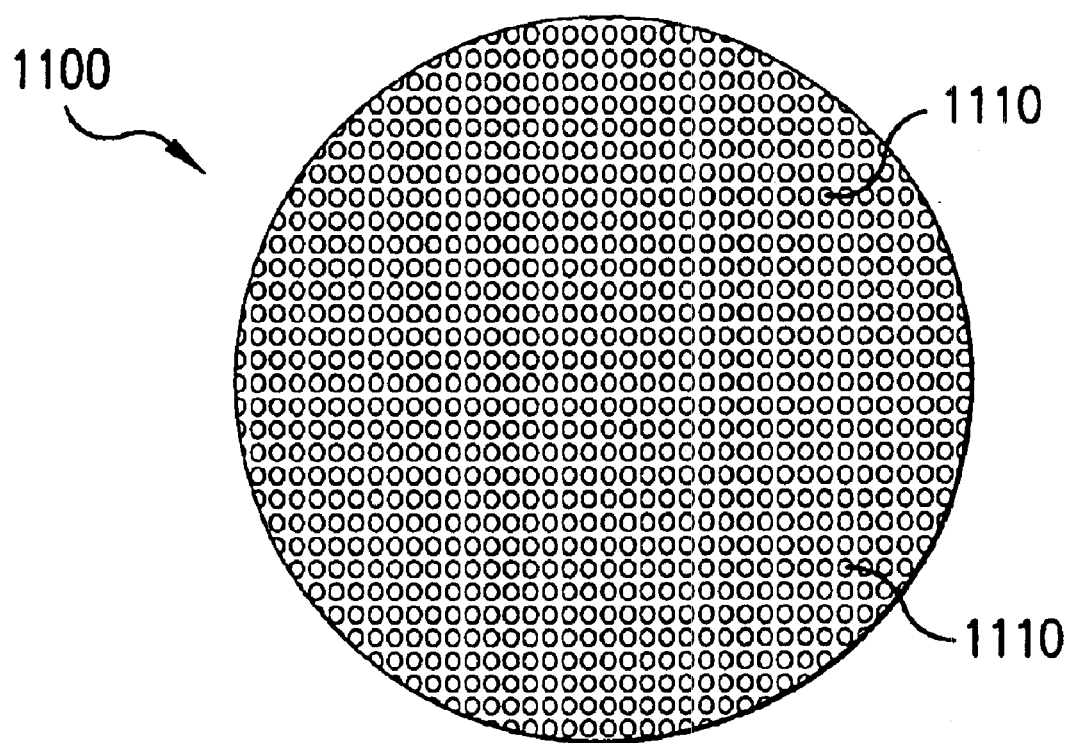
FIG. 11 is a front view of a non-opaque refractive layer as may be employed in another alternative embodiment of the present invention.

FIG. 11 is a front view of a non-opaque refractive layer 1100 employing a plurality of individual addressable pixels or regions 1110. As can be seen, these individual addressable pixels or regions 1110 cover the entire non-refractive layer in this embodiment. In alternative embodiments these individual addressable pixels or regions may have other shapes as well, including hexagonal, stellate, oval and rectangular shapes. These individual addressable pixels or regions 1110 may be individually addressed and controlled by a controller such that only in particular regions will a non-opaque variable index material contained within the regions or controlled by the individual addressable pixels or regions 1110 be activated. In so doing, various alternative refractive properties and reflective properties may be created by a mirror employing this non-opaque refractive layer 1100. In particular, the lens 1100 can be operated in an "all pixels on" mode, with each pixel addressed with a different voltage, or an "all pixels off" mode, or any mode in between these extremes. Furthermore, the layer can create prism effects in addition to power effects through the use of the pixels 1110.

Figure 12:
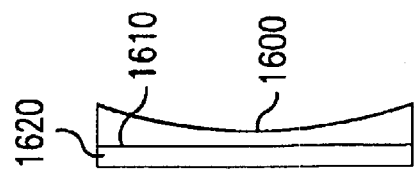
FIG. 12 is a side cross-sectional view of an active lens employing the non-opaque refractive layer from FIG. 11 in accord with another alternative embodiment of the present invention.

FIG. 12 is a side cross-sectional view of an active lens of a mirror assembly employing the non-opaque refractive layer 1100 from FIG. 11. As can be seen, this non-opaque refractive layer 1100 may be positioned in the center of the active lens's co-planar faces 1220. Alternatively, in other embodiments, this non-opaque refractive layer 1100 could be located or biased toward one of these two faces 1220.

Figure 13:
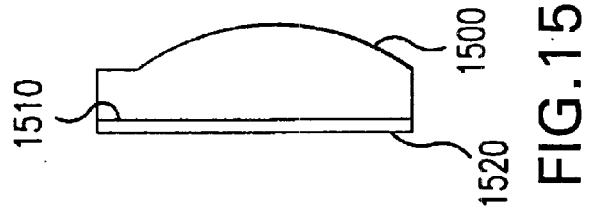
FIG. 13 is a side cross-sectional view of an active lens in accord with another alternative embodiment of the present invention.

FIG. 13 is a side view of an active lens of a mirror assembly in accord with another alternative embodiment of the present invention. In FIG. 13, rather than having straight planar faces, the active lens has one convex lens 1300 positioned center of one of the lens faces 1320. By having this fixed convex lens 1300 work in conjunction with a non-opaque refractive layer 1310, various reflective effects may be created.

Figure 14:
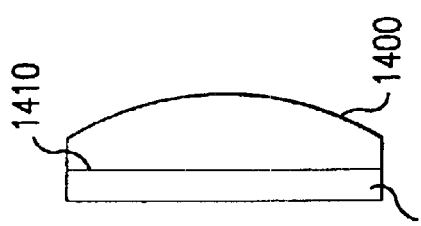
FIG. 14 is a side cross-sectional view of an active lens in accord with another alternative embodiment of the present invention.
Figure 15:
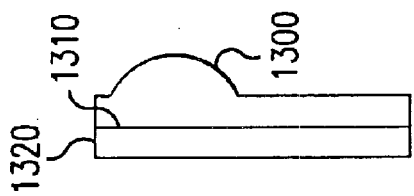
FIG. 15 is a side cross-sectional view of an active lens in accord with another alternative embodiment of the present invention.
Figure 16:
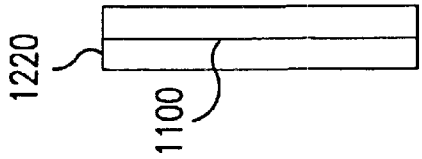
FIG. 16 is a side cross-sectional view of an active lens in accord with another alternative embodiment of the present invention.

FIGS. 14 through 16 are other alternative embodiments of active lens of mirror assemblies in accord with the present invention. In FIG. 14, one face of the active lens creates a complete convex lens 1400, whereas in FIG. 15 the convex lens 1500 makes up a portion of one face of the active lens and in FIG. 16, rather than having a convex lens as in the previous embodiments, one face of the active lens forms the shape of a concave lens 1600. By altering the position and curvature of each one of these concave or convex lenses, the optical properties of the mirror assemblies may be changed and modified as needed.

Figure 17:
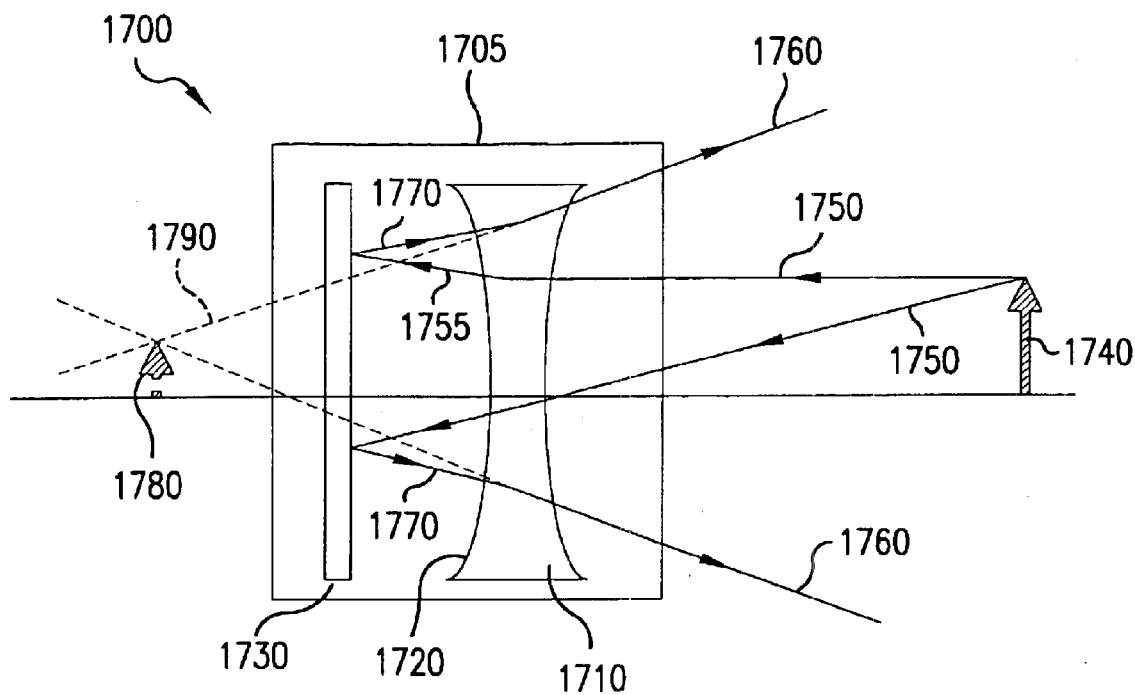
FIG. 17 is a side cross-sectional view of a mirror assembly in accord with another alternative embodiment of the present invention.

FIG. 17 is a side cross-sectionall view of another embodiment of a mirror assembly 1700 of the present invention. The mirror assembly 1700 in this embodiment includes an active lens 1705. Rather than having the variable index material 1710 positioned along and between two transparent layers as in the previous embodiments, the variable index material 1710 in this embodiment is placed within a predefined void 1720 shaped in the form of a double concave lens. This active lens 1705 also includes a reflective surface 1730 positioned behind the variable index material-filled void 1720. In use, when the variable index material 1710 is activated via an electrical signal or some other type of activation mechanism, light entering the void may be refracted by the variable index material 1710 based on the refractive index of the variable index material 1710, as well as the shape of the void 1720. Light rays 1750, 1755, 1760, and 1770 passing through the lens 1705 are bent from their original line of travel. As a consequence, the reflected image 1780 is de-magnified.

The variable index material 1710 of FIG. 17 has divergent refractive power. Alternatively, the predefined void 1720 may be shaped in the form of a convergent lens, such that the variable index material 1710 has convergent refractive power. Moreover, while the active lens 1705 is shown as a square, other configurations depending upon the specific application of the mirror may be employed.

Figure 18:
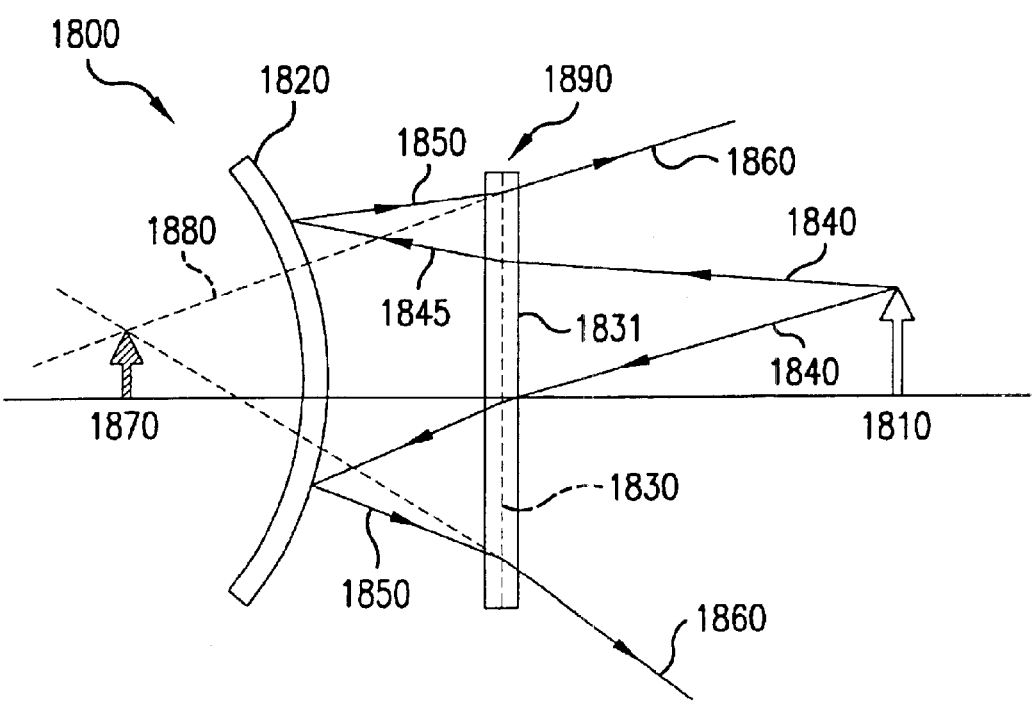
FIG. 18 is a side cross-sectional view of a mirror assembly in accord with another alternative embodiment of the present invention.

FIG. 18 is a side view of another embodiment of a mirror assembly 1800 according to the present invention. The mirror assembly includes a diverging spherical mirror or refractive surface mirror 1820 and an active lens 1890. The use of a spherical mirror 1820 rather than a piano mirror as in FIG. 6 provides additional reflective power of the variable index material 1830. The active lens includes two glass (or other transparent material) layers 1831 and a non-opaque variable index material 1830 therebetween. Here, the non-opaque variable index material 1830 is in an active state such that its index of refraction is different than the active lens 1890 that contains it. As a result of this difference and as illustrated in FIG. 18, rays of light 1840, 1845, 1850, and 1860 passing through the active lens 1890 and through the non-opaque variable index material 1830 are refracted and bent from their original line of travel. The rays are first bent by the active lens 1890 and further by the spherical mirror 1820. As a consequence, the reflected image 1870 seen on spherical mirror 1820 is smaller than the object 1810 and smaller than the virtual object 670 in FIG. 6. Consequently, by modifying the non-opaque variable index material 1830 through the use of a stimulus such as a potential voltage, a chemical stimulus or a thermal stimulus, the magnification power of the mirror assembly 1800 can be temporarily modified or toggled off and on.

In yet other alternative embodiments rather than employing a fixed diverging mirror, a fixed converging mirror may be used instead or in addition to it.

In another alternate embodiment and as mentioned above, the assembly could also be constructed to add an optional prism effect to the reflected image, alone or along with demagnification power. This may be accomplished by setting the voltage array to the pixels of FIG. 11, for example, in a way that provides both prism and focusing power. Alternatively, a prism may be affixed to a glass layer of the active lens. A possible action of the prism embodiment may be, by way of example only, to eliminate the blind spot by shifting the image in a side view mirror to yield a wider field of regard in either the presence or absence of demagnification power/wider field of view.

Figure 19:
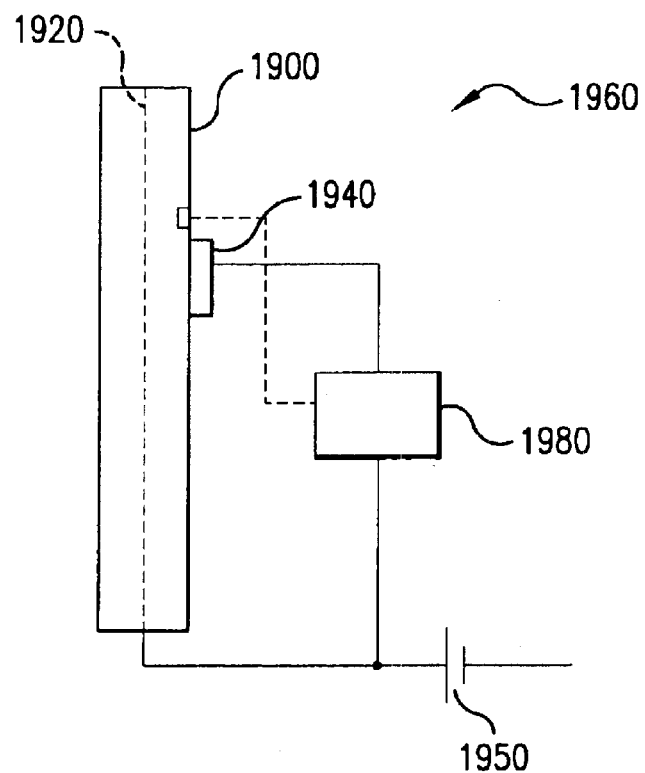
FIG. 19 is a side cross-sectional view of an active lens in accord with another alternative embodiment of the present invention.

FIG. 19 shows another embodiment of an active lens 1960 according to the present invention. FIG. 19 shows a filament heater 1980 that draws a small current from the voltage source 1950 that supplies the loops surrounding the variable index material 1920. The heater 1980 then warms the active lens 1960 to a suitable temperature so as to preserve the viability of the mirror assembly.

In this embodiment, a solid-state thermostat 1940 measures the temperature of the lens 1960 and controls the electricity flow to keep the temperature above a reference damage point. The filament heater 1980 can be made from metal and placed on top of the transparent material 1900. Alternatively, the heater 1980 may be placed behind the variable index material 1920. The heater 1980 may be made from a transparent conductive oxide, such as indium tin oxide ITO, if it is desired to bring the heating filament closer to the variable index material 1920 to minimize the thermal losses due to heating the variable index material 1920 through the transparent material 1900. Alternatively, an ITO heater that provides the voltage bias to heat the variable index material 1920 may superimpose the voltage to activate the variable index material 1920.

Figure 20:
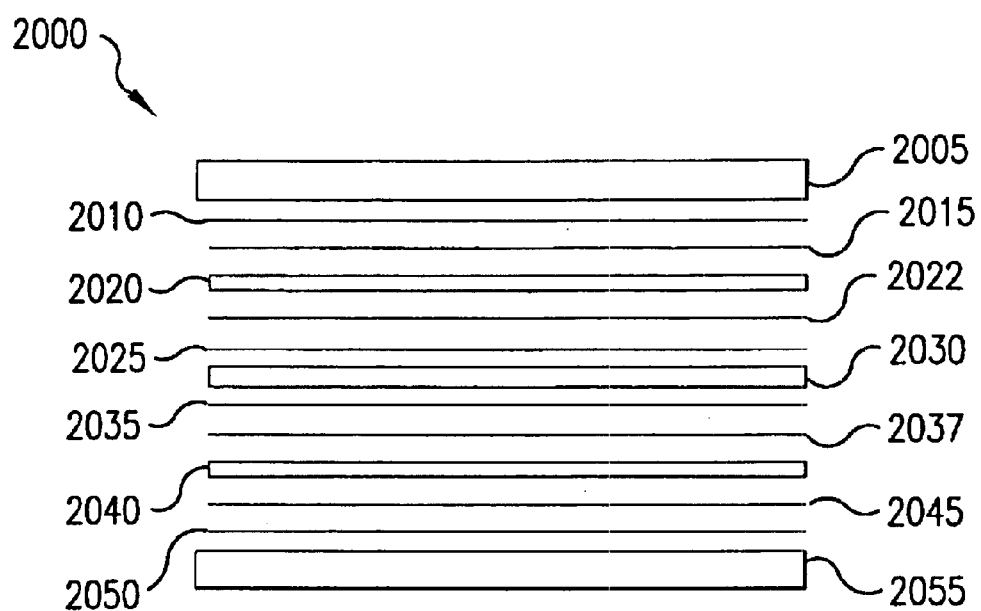
FIG. 20 is a side cross-sectional view of an active lens in accord with another alternative embodiment of the present invention.

FIG. 20 shows another embodiment of an active lens 2000 in clarity with minimal loss of light transmission. The active lens 2000 in this embodiment includes front and rear plano substrate components 2005, 2055, electrodes 2010, 2025, 2035, 2050, alignment layers 2015, 2022, 2037, 2045, variable index (or reflective) layers 2020, 2040, and a separator layer 2030. This embodiment includes two refractive cells separated by the separator layer 2030. The cells may be aligned orthogonal to each other if the variable index material is, by way of example, a nematic liquid crystal, thereby reducing or eliminating birefringence.

The front component 2005 in this embodiment can be made from optical grade glass, plastic, or a combination of glass and plastic, for example. The back of this front component 2005 may be coated with a transparent conductor such as ITO, tin oxide, or other electrically conductive and optically transparent materials, to form an electrode 2010. In embodiments where the variable index area of the lens is smaller then the entire lens assembly 2000, the electrode 2010 may be solely placed over the variable index area of the lens 2000 to minimize power consumption.

The electrode 2010 may be coated with an alignment layer 2015 to provide orientation to the liquid crystal, or other variable index polymeric material layer 2020. The molecules in the liquid crystal layer 2020 change their orientation in the presence of an applied electrical field, resulting in a change in the index of refraction experienced by an incident ray of light. The liquid crystal layer 2020 may be nematic, smectic, or cholesteric, for example. Exemplary nematic phase crystals include 4-pentyl-4'-cyanobiphenyl (5CB) and 4-(n-octyloxy)-4'-cyanobiphenyl (8OCB). Other exemplary liquid crystals include the various compounds of 4-cyano-4'-(n-alkyl)biphenyls, 4-(n-alkoxy)4'-cyanobiphenyl, 4-cyano-4"-(n-alkyl)-p-terphenyls, and commercial mixtures such as E7, E36, E46, and the ZLI-series made by BDH (British Drug House)-Merck.

Another alignment layer 2022 may be disposed on the other side of the liquid crystal layer 2020, typically over an electrode 2025. The electrode 2025 may be produced in a similar manner as the electrode 2010 and complete one cell of the lens 2000. The driving voltage waveform may be applied across electrodes 2010 and 2025.

After the separator layer 2030, the next cell may be disposed such that it is orthogonally aligned from the first cell. The separation layer may be constructed from an optical grade plastic, such as CR39™, glass, or other polymeric materials. An electrode 2035 for the second cell may be disposed on the separator layer 2030. The variable index material in the second cell is preferably aligned to the orientation of the alignment layers 2037, 2045 applied to the electrodes 2035, 2050. A preferred orientation may be such that the alignment layers 2015 and 2022 in the first cell are orthogonally oriented to the alignment layers 2037 and 2045 in the second cell. The second cell may also include a liquid crystal layer 2040 as described above. The second cell may be completed with the electrode 2050 deposited on the back piano substrate component 2055. The back substrate component 2055 may be constructed from similar materials as the front substrate component 2005. In an alternate configuration, a single alignment layer may be used in each cell.

Optical power can be produced in the present invention by creating diffractive patterns on the back surface of the front substrate component 2005, the front surface of the back substrate component 2055, or on both. Optical power can also be produced by creating diffractive patterns on one or both sides of the separator layer 2030 instead of, or in addition to, diffractive patterns placed on the substrate components 2005, 2055. In fact any combination of placement of diffractive patterns described above is possible and considered within the scope of the present invention.

Diffractive patterns can be created using a number of techniques including machining, printing, or etching. When the diffractive patterns are used to produce the optical power, the liquid crystal layers 2020, 2040 can be used to match the refractive index of all the layers in order to hide the additive power of the diffractive pattern in one index state, and to mismatch the refractive index in all the layers in order to reveal the power of the diffractive pattern in the other index state, where each state may be defined by whether the applied voltage (or electric field) is on or off.

Figure 21:
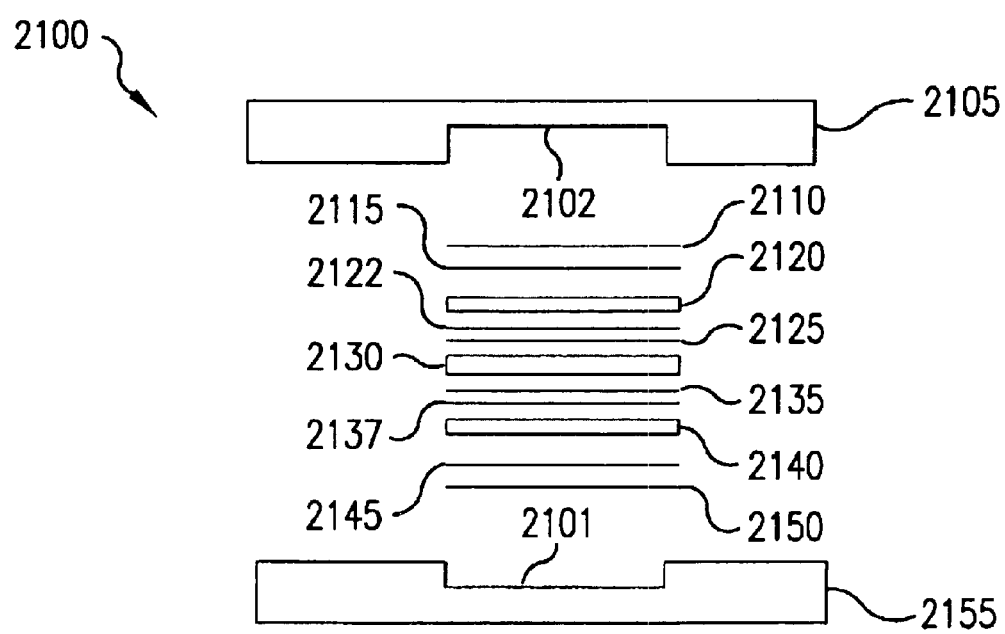
FIG. 21 is a side cross-sectional view of an active lens in accord with another alternative embodiment of the present invention.

FIG. 21 shows an active lens 2100 of the present invention where by the variable index region occupies only a portion of the total lens area, allowing for an active lens that is easier to seal. In FIG. 21, the active lens 2100 includes dual cells and multiple layers, as in FIG. 20. The layers may be disposed within recesses 2102 and 2101 on the back and front substrate components 2105 and 2155, respectively. In this embodiment, transparent conductive electrodes 2110, 2150 may be deposited inside of the respective recesses 2101, 2102 of substrate components 2105, 2155. The electrodes 2110, 2150 may be made of ITO, for example. The substrate with recesses 2101, 2102 may be made from glass or ophthalmic grade plastic, for example.

Polymethyl methacrylate (PMMA) or other suitable optical polymeric materials may be spin-coated onto the transparent electrodes 2110, 2150 to form polymer layers 2115 and 2145, respectively. Exemplary thickness of the polymer layers 2115 and 2145 is 2 to 10 microns, preferably 3 to 7 microns.

As in FIG. 20, diffractive lens patterns may be etched or stamped into both polymer surfaces 2115 and 2145. Liquid crystal alignment surface relief (not shown) in a form of sub-micron gratings may be stamped or etched onto the lens-patterned polymer surfaces 2115 and 2145. The remainder of the variable index region is fabricated in the same manner as describe above with regards to FIG. 20, with all layer required for the rest of the variable index region contained within the recesses 2102 and 2101.

This embodiment may include a fail-safe mode, in which the active lens reverts to a piano, unmagnified state when voltage is no longer applied. As such, the active lens provides no optical power in the absence of electrical power. This mode is a safety feature for instances where the power supply fails.

In another embodiment, the chromatic aberrations in the cell may be reduced by designing one cell to transmit light with a wavelength slightly longer than green light (550 nm) and the other cell for a wavelength slightly shorter than green light. In this embodiment, the two cells can correct both the birefringence and the chromatic aberration at the same time.

Without a significant difference in index of refraction between the diffractive pattern surface and the liquid crystal layer, there is no power contributed to the lens by the diffractive pattern.

Figure 22:
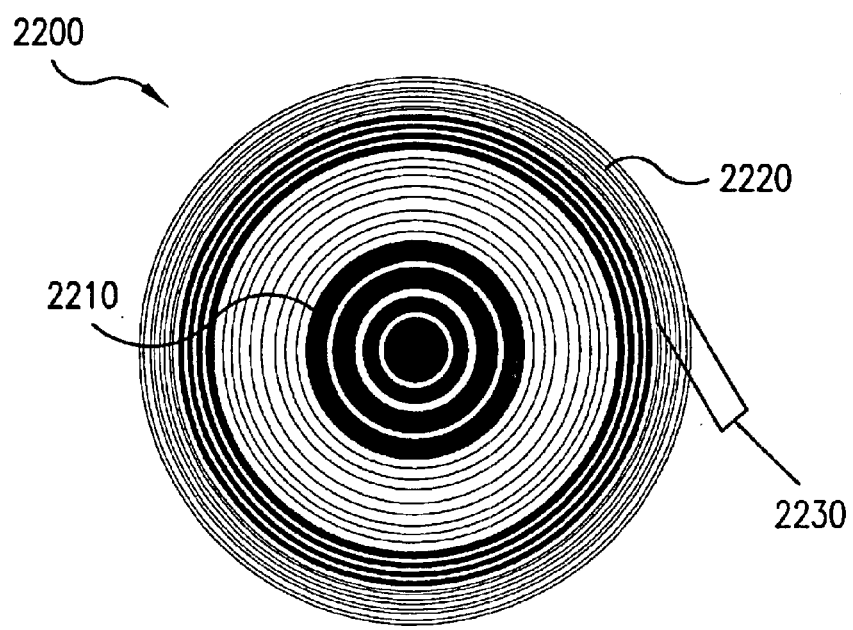
FIG. 22 is a front view of an activation layer made up of electrical concentric loops in accord with another alternative embodiment of the present invention.

FIG. 22 shows another embodiment of electrical concentric loops according to the present invention, similar to the loops in FIGS. 10A–10C. In this embodiment, an automatic fail-safe mode provides no power in the variable index material in the absence of applied voltage, so the active lens automatically reverts to piano in the event of a power failure.

In FIG. 22, the loops emulate a diffractive pattern with integer multiples of $2\pi$ phase wrapping. Phase wrapping is a phenomenon in which the phase of the light is repeated (or "wrapped") at various locations or zones along the active lens diameter. The patterned electrode structure 2200 includes four (4) phase-wrapping zones. The more central electrodes 2210 may be thicker than the electrodes 2220 further from the center. As can be seen from FIG. 22, a group of four electrodes 2230 makes up each phase-wrapping zone.

The electrodes may be four patterned ones. Alternately, the electrodes may be two patterned and two solid ones. The second patterned electrodes may be used to dither the focusing of the active lens to compensate for strong chromatic aberration. Additionally, this embodiment may provide for sequential focusing strength without complex electrical interconnects.

Electrical contacts (not shown) can be made to the electrodes through thin wires or conductive strips at the edge of the lens or by a set of conducting vias down through the lens. The electrodes 2200 may be patterned in either or both of the two cells within the lens. In a dual cell design, it is also possible to use one cell with diffractive patterns and one cell with patterned electrodes so long as the powers are matched enough to address the birefringence.

When creating a diffractive pattern with the concentric electrodes 2200, a refractive material activated by the electrodes 2200 may impress a phase transformation upon an incident light wave. This embodiment emulates the conventional lens by using a flat structure with variable phase retardation from the center of the structure outward. The variable phase retardation may be accomplished by applying variable voltages to different electrodes 2200, which in turn, modify the refractive index profile of the variable index material.

The variable index portion of the lens may be thin, for example less than a fraction of a millimeter in total thickness. In order to attain this thinness, the present invention makes use of the fact that, for sinusoidally varying waves, phase shifts of 2π multiples carry no physical significance. In other words, the phase of the incoming light may be "wrapped" along convenient closed curves within the lens. The circular zone boundaries of the classical zone plate are examples. Thus useful phase transformations and significant optical power can be achieved when the controllable throw of an active lens is only a few waves of retardation.

The spatial variations of the phase retardation in the active lens are determined based on the particular application. The variations may be determined by the spacing of the electrodes 2200, which can be electronically addressed, powered, and established on the interior of the active lens. In an exemplary nematic liquid crystal configuration, where the crystals act as uniaxial media, light traveling through the crystal may be restricted to extraordinary polarization. Otherwise, two liquid crystal cells may be used in tandem, rotated 90 degrees out of phase from normal in order to swap their ordinary and extraordinary directions of polarization, thus eliminating birefringence. Each of these configurations provides a particular index of refraction. To avoid long-term decomposition of the liquid crystals, electrical polarization between dual cells, and random transient voltages in the spaces between electrodes, the electrodes may be driven with frequency- and phase-synchronized AC voltages. Exemplary frequencies include 10 kHz and exemplary high voltages range from 5 to 10 V, preferably a maximum between 6 and 8 V. Alternatively, lower voltages are desirable for compatibility with low power CMOS drive circuitry, such that materials that provide adequate index changes at less than 5 or 6 volts may be used.

In one embodiment, phase-wrapping zones may include few electrodes, with zones closer together. Alternatively, electrodes with higher resistance material may be used to smooth fringing fields (so called "phase sag"). In another embodiment, a second phase transformation may be cascaded onto the first by patterning another electrode 2200 within the same cell, rather than using it simply as a continuous ground plane.

It is to be understood that there is a wide choice of pixel layouts, restricted only by fabrication limitations, by electrical connection and electrode separation restrictions, and by the complexities of the interplay of the non-local elastic behavior of liquid crystal directors with electric fringe-fields at small dimensions.

An exemplary fabrication method for an active lens of the present invention includes fabricating a window into the electrode pattern of the lens and interconnecting the electrodes and the electrical contact pads. A second window may be connected to electrical ground. Next, liquid crystal alignment layers may be deposited on both windows and treated. Two appropriately oriented windows may be made into a liquid crystal cell by establishing spacing between the windows with glass-spacer-containing epoxy, for example, and then filling the established spacing with the liquid crystals and sealing the windows together with epoxy. The windows may be laterally shifted to make electrical connection by simple pressure attachments to the electrical contact pads. The electrode and interconnection patterns may be established using photolithography with CAD generated masks. Developing, etching, and deposition techniques may be used. In an alternate design, multi-layers with simple conducting inter-level connecting vias may be used to avoid interconnection crossings.

In designing the electrodes 2200, the zone boundaries may be placed at multiples of 2π, consistent with conventional phase wrapping. So for boundary placements at every 2 mπ, the radius of the nth wrapping is given by the expression:

$$\rho_{nm} = [2\ nm(\lambda f)]^{1/2} \quad (1)$$

Each zone contains multiple electrodes. If there are p electrodes per zone, then Equation (1) can be modified to $$\rho_{knm} = [2\ km\ (\lambda f)/p]^{1/2} \quad (2)$$

$$k = [p(n-1)+I] = 1, 2, 3, 4, \quad (3)$$

where I is an index running from 1 to p for the intra-zone pixels and k is an index which counts sequentially outward, maintaining the sequence of pixel boundaries as square roots of the counting numbers k. To raise adjacent electrodes to different voltages, insulating spaces may be inserted between the electrodes. The sequence of electrodes may be separated by circles with radii increasing as the square root of the counting numbers. All electrodes with the same index I may be ganged together with electrical connections shared between them since they are intended to produce the same phase-retardation, thereby reducing the number of different electrical connections to the electrodes.

Another embodiment provides for setting a phase delay in an active lens of the present invention with thickness variations. In this embodiment, the applied voltage to each electrode loop 2200 may be tuned until the phase delay of the lens attains the desired value. Accordingly, individual loops may have different voltages applied constantly to create the appropriate phase delay. Alternatively, the same voltage may be applied to all the electrodes in a zone and different voltages applied to different zones.

Another embodiment provides for setting a different phase delay at the edges of a lens of the present invention because of oblique light rays. Oblique rays are light rays that are refracted by the lens and invariably travel outward through the lens edges. Accordingly, the oblique rays travel farther distances, such that they are significantly phase-delayed. In this embodiment, the phase delay may be compensated for by applying a predetermined constant voltage to the electrodes at the lens edges. Alternatively, the electrodes at the lens edges may create a voltage drop such that the refractive index at the edges is appropriately modified to compensate for the phase delay. This voltage drop may be achieved by tailoring the electrode conductivity or thickness accordingly, for example.

As an alternative to the dual cells of FIGS. 20 and 21, a single cell may be used to reduce or eliminate birefringence, particularly in nematic liquid crystals. In one embodiment, a cholesteric liquid crystal configuration of the cell may replace the conventional nematic liquid crystals. This cholesteric configuration includes a twisted nematic crystal arrangement characterized by liquid crystal molecules in a polymer chain oriented at an angle, called a twist angle, to each other. This configuration provides a single effective refractive index to the incoming light such that linearly polarized components of the light are not rotated. And the light experiences a uniform distribution of the orientation of the liquid crystal director, i.e. vector. Accordingly, the birefringence effect is reduced or eliminated.

Optical rotary power is a measure of the efficiency of a particular material in rotating linearly polarized light as it passes through the material. The rotary power ranges from 0.0–1.0, with 0.0 indicating no rotation and 1.0 indicating complete rotation. Accordingly, in designing the cholesteric configuration of this embodiment, the rotary power is targeted to be as close to 0.0 as possible. To do so, two parameters of the lens single cell may be considered: cell thickness and twist angle. The cell thickness may be set such that the cell can operate effectively in both an activated and non-activated state, i.e. when voltage is and is not applied to the cell. The twist angle may be obtained by introducing a relatively large concentration of a chiral agent, which effectively prevents incoming light rotation. Chiral agent concentrations directly determine the amount of rotation. The concentration level depends on the mirror application, where a typical larger concentration is 20%. The twist angle, generally defined by the period of rotation of the polymer material, i.e. the pitch, may be set to be larger than the wavelength of the incoming light.

In the activated state, the twisted configuration of the cholesteric configuration may be suppressed such that the crystals form a uniform perpendicular alignment. In the non-activated state, the twisted configuration provides a nearly-randomly distributed orientation such that the active lens operates in a tail-safe mode. In the non-activated state, an exemplary 2–5% of the incoming light maintains its polarization, while 95–98% experience random polarization. So, the use of a cholesteric configuration with a design of the pitch length to construct a liquid crystal cell based on a patterned electrode design with effective birefringence provides a simple single cell.

Additionally, the design of this cholesteric embodiment may consider the degree of randomness of the distribution for the non-activated state, the degree of light scattering in the activated state, the twisted configuration in the activated state, the amount of voltage applied to achieve perpendicular alignment in the activated state, the optical power needed, and the F-number of the lens.

In another embodiment in which a single cell may be used to reduce or eliminate birefringence, particularly in nematic liquid crystals, a polymer-dispersed liquid crystal (PDLC) structure may replace the conventional nematic liquid crystals. In this embodiment, micrometer-size liquid crystals, or droplets, may be densely dispersed within a host polymer matrix to form the liquid crystal layer in the lens. The refractive index of the polymer may be matched to the ordinary refractive index of the liquid crystal droplets. In the non-activated state (i.e., when no voltage and therefore no electric field is applied to the lens), the liquid crystal director in the various liquid crystal droplets is randomly oriented, resulting in a random variation of the effective refractive index from droplet to droplet. These refractive index variations result in a heavy scattering of any incident light beam due to the near-wavelength size of the droplets. As one applies an electric field, the liquid crystal director in the droplets becomes co-aligned to the electric field. The refractive index now appears uniform across the entire PDLC layer since in this state the refractive indexes of both the polymer and the liquid crystal are matched. The uniform PDLC phase now appears completely transparent to the incident light beam. The PDLC can, therefore, be used as a polarization-independent optical (amplitude) modulator.

Alternatively, sub-wavelength size droplets may be used. In this case, due to the smaller than wavelength size, the incident light beam is not scattered by the randomly distributed droplet's refractive index in the non-activated state. Rather, the optical beam now experiences an "effective refractive index" which is a weighted average between that of the polymer and that of the liquid crystal. As an electric field is applied, the liquid crystal director in the various droplets may again co-align, leading to the appearance of a uniform index of the liquid crystal droplets and the polymer matrix. So in the case of sub-wavelength size droplets, the PDLC behaves as a polarization-independent phase modulator. This form of PDLC modulator uses a relatively high bias voltage.

Liquid crystal alignment layers can be produced to achieve either homogeneous (planar) and homeotropic (perpendicular) alignment. In an embodiment of liquid crystal layers having homogeneous alignment, ultraviolet sensitive materials may be irradiated with linearly polarized ultraviolet light and then put through a photo-physical process to produce anisotropic surface anchoring forces. The resulting material has homogeneous alignment. One example of such a material is polyvinyl cinnamate. In an alternate embodiment, a thin polymer film may be mechanically rubbed to homogeneously align the material. One example of this material is polyvinyl alcohol.

In an embodiment of liquid crystal layers having homeotropic alignment, exemplary materials include a common biological compound called $_{L-\alpha}$-Phosphatidylocholine, commonly referred to as Lecithin, and octadecyltriethoxysilane (ODSE), a material with a long hydrocarbon chain that attaches itself to the surface of the substrate in a preferential manner. These materials make the surface of the active lens substrate hydrophobic, which in turn attracts the hydrophobic end of the liquid crystal molecules, causing them to align homeotropically.

Figure 23:
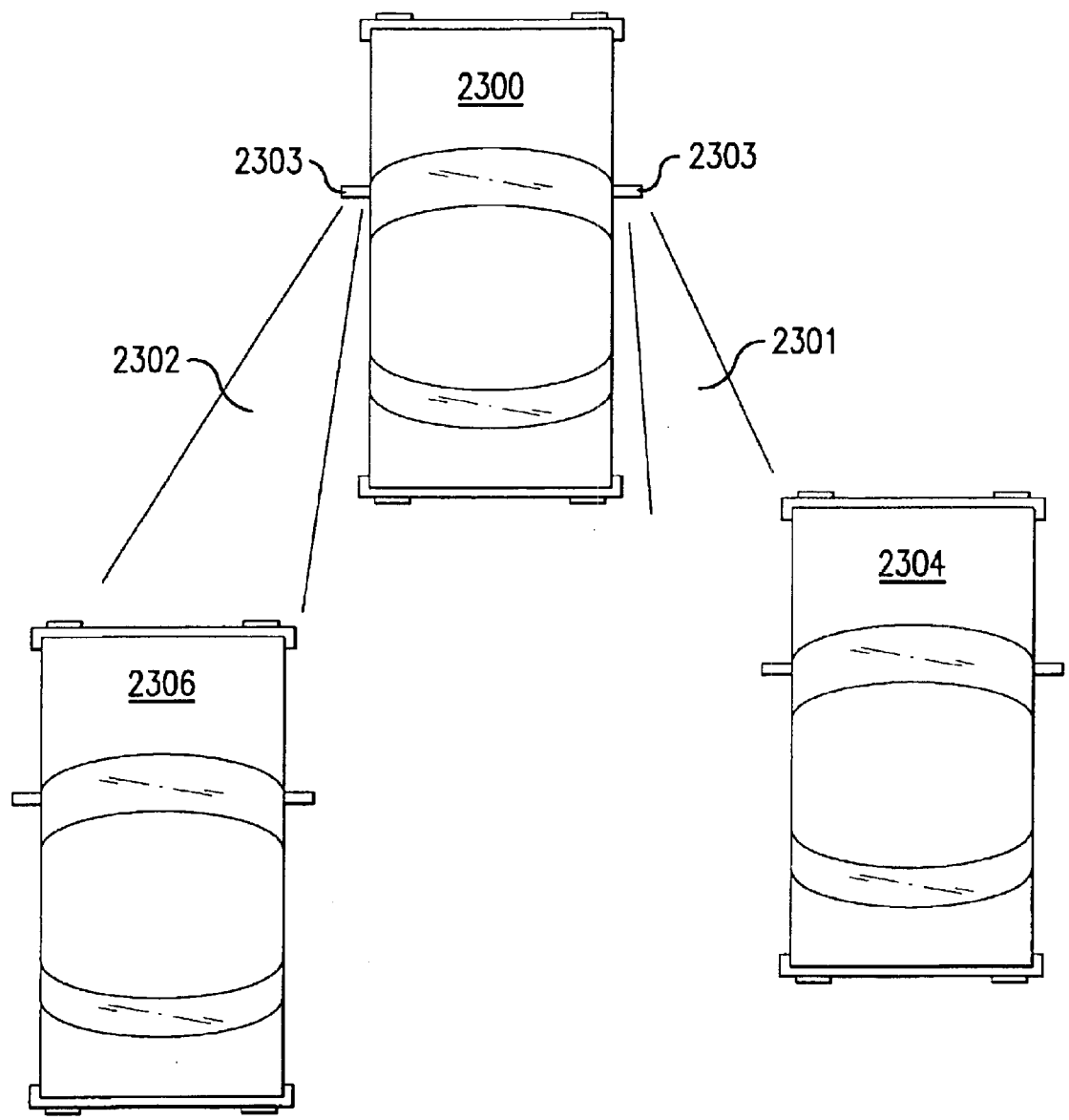
FIG. 23 is a top view of a motor vehicle employing a blind spot system in accord with an alternative embodiment of the present invention.

FIG. 23 illustrates an exemplary application for the present invention in vehicle rear and side view mirrors to eliminate drivers' blind spots. In FIG. 23, three vehicles 2300, 2304, and 2306 are moving in traffic. The center vehicle 2300 is approached on the right side by vehicle 2304 and on the left side by vehicle 2306. Depending on the positions of the center vehicle's mirrors 2303, the driver's head, and the approaching vehicles, in a traditional mirror system, the driver at some point would not be able to see either or both of the approaching vehicles 2304, 2306. The vehicles 2304, 2306 will have entered the driver's blind spot. Embodiments of the present invention provide reflective modifications to the center vehicle's mirrors 2303 such that the driver's field of view is greater. Hence, the field of view available to the driver of the center vehicle 2300 looking into the side view mirrors 2303 is widened such that the approaching vehicles 2304, 2306, both previously in blind spots of the driver of the vehicle 2300 are now visible. In other words, through the use of the present invention, a vehicle previously positioned in the blind spot of a driver is now visible after the mirror system has been activated to modify the available field of view.

Figure 24:
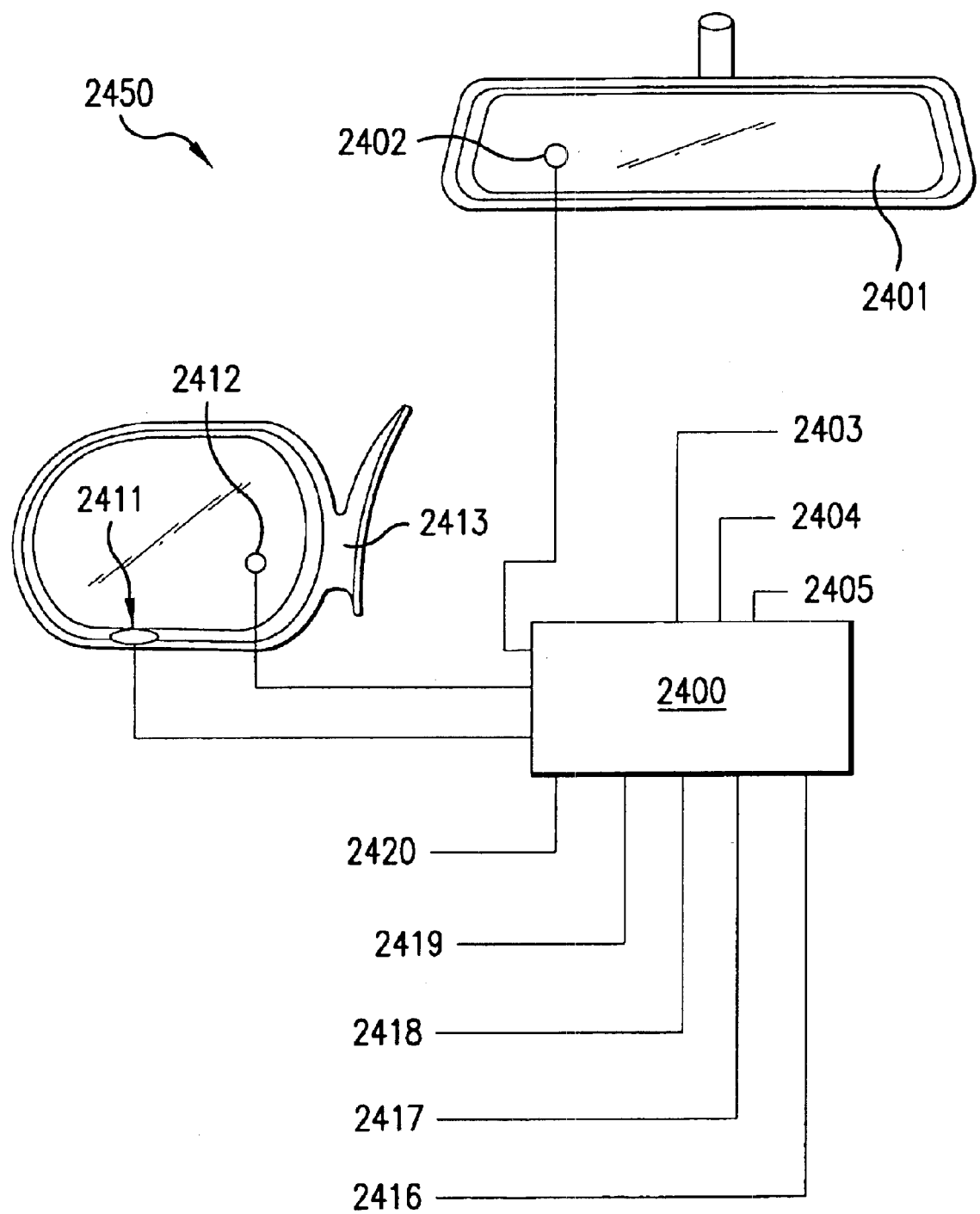
FIG. 24 is a blind spot system for a motor vehicle in accordance with an alternative embodiment of the present invention.

According to one embodiment of the application, FIG. 24 shows various components of the present invention employed in a vehicle. This blind spot system 2450 includes a rearview mirror 2401, a rearview mirror sensor 2402, a controller 2400, a side view mirror sensor 2412, a side view mirror 2413, a range detector 2411, and various signal inputs 2403 to 2405, 2416 to 2420. In use, depending upon the stimulus or signals received by the controller 2400, the driver of a motor vehicle may modify the field of view available in the rearview mirror 2401 and the side view mirror 2413. This motor vehicle may be any one of numerous motor vehicles currently in use today, including cars, trucks, RVs, motor boats, motor cycles, construction equipment, and airplanes. There may also be more than one side view mirror 2413.

The rearview mirror 2401 and the side view mirror 2413 include the mirror assembly of the present invention. The driver of the vehicle uses the mirrors 2401, 2413 to observe approaching traffic.

The rearview mirror sensor 2402 is disposed on the rearview mirror 2401 and connected to the controller 2400. The sensor 2402 detects any object behind the vehicle. The sensor 2402 feeds a signal to the controller 2400 when the sensor detects a rearward object that moves into the driver's blind spot so that the controller can modify the rear view mirror's 2401 magnification level.

The side view mirror sensor 2412 is disposed on the side view mirror 2413 and connected to the controller 2400. The sensor 2412 detects any object in the vehicle's blind spot. The sensor 2412 feeds a signal to the controller 2400 when the sensor detects an object in the driver's blind spot so that the controller 2400 can modify the magnification level employed by the side view mirror 2413.

Alternatively, the range detector 2411 detects any object in the vehicle's blind spot. The range detector 2411 is disposed as the base of the side view mirror 2413 and is connected to the controller 2400. The range detector 2411 feeds the distance of objects in the drivers blind spot to the controller 2400 so that the controller 2400 can modify the magnification level employed by the side view mirror 2413.

The blind spot position may be determined by placing targets along the side and back of the vehicle or by having someone stand along the side of the vehicle at a position where the driver can no longer see the target or person. The range detector 2411, the side view mirror sensor 2412, or the rearview mirror sensor 2402 may be adjusted until it points at the target or person. This distance and direction is determined to be the blind spot of the driver. The blind spot may be determined for various sitting heights and mirror positions.

The sensors 2402, 2412 and the range detector 2411 may be alternatively mounted on separate pivots from the mirrors. Here, they may be positioned independent of their respective mirrors. With this configuration, to determine the blind spot position, the driver may move the mirrors 2401, 2413 to different positions to determine the regions to the rear and side that he can not see when the mirrors 2401, 2413 are in normal or preferred position. In this manner, the driver may align the range detector 2411 and sensors 2402, 2412 with the plane of the mirrors 2401, 2413 in the position when the blind spot is visible and then return the mirrors 2401, 2413 to their preferred positions, leaving the detector 2411 and sensors 2412, 2402 positioned on the blind spot.

Various input signals include a left turn signal input 2420, a right turn signal input 2419, a left steering input 2418, a right steering input 2417, a manual override 2416, a manual right side control 2403, a manual left side control 2404, and a manual rearview control 2405. These signals connect to the controller 2400. The left and right turn signal inputs 2420, 2419 send an input to the controller 2400 when the driver activates the left or right turn signal. The left and right steering inputs 2418, 2417 send an input to the controller 2400 when the driver turns the steering wheel left or right. The manual override 2416 allows the driver to override automatic mirror modification. The manual right and left side controls 2403, 2404 allow the driver to manually modify the field of view in the right and left side view mirrors 2413. The manual rearview control 2405 allows the driver to manually modify the field of view in the rearview mirror 2401.

The manual override 2416 and controls 2403–2405 could be simple buttons on the dashboard or steering wheel that the driver pushes to manually modify the mirror assemblies. When the driver pushes the override 2416, the controller 2400 receives an indication that the system is in manual mode and the driver will select the mirror in which to modify the field of view. When the driver pushes one of the manual controls 2403–2405, the controller 2400 receives an indication to change the field of view of the selected mirror. The manual controls 2403–2405 could be a toggle switch where the driver simply pushes the button to go between a larger and a normal field of view. Alternatively, the system could be designed with a, timer so that the modified field of view remains constant for a few seconds after the controls 2403–2405 are pushed and then goes back to the normal field of view. A combination of a toggle switch and a timer could also be used, where the button pushed toggles the field of view in the mirrors, but defaults to the normal field of view after a predetermined period of time.

The controller 2400 generates the electrical or other signal to activate the reflective modifications of the mirror assembly of the present invention in the rear and side view mirrors 2401, 2413. The controller 2400 generates the signal based on inputs from the sensors 2402, 2412, the detector 2411, and the signal inputs 2403–2405, 2416–2420. The controller 2400 then sends that generated signal to the appropriate mirror assemblies to activate the modifications. The driver's field of view is then changed so that the driver may see the object in his blind spot.

In addition to receiving input from these various sensors, the controller 2400 may also consider the speed of the vehicle to determine the length of time for which the mirrors may be adjusted. Moreover, various warning lights or sound generators may also be coupled to the controller 2400 to further alert the driver to potential hazards in his blind spot. Still further, the controller 2400 may also be adjusted to consider the driver's eye height, seat position, standard mirror settings, as well as various previously-programmed driver preferences, in order to determine the level of mirror modifications that the controller 2400 will employ. The controller 2400 may also generate visible or audible indicators when the field of view is about to be adjusted. Such a feature may be used in either the manual or automatic mode.

Exemplary operation of the blind spot system 2450 is described as follows. When an object enters the driver's blind spot from the rear, the rearview mirror sensor 2402 detects the object and sends a signal to the controller 2400. The controller 2400 upon receiving the signal from the sensor 2402 generates a electrical or other signal and sends it to the rearview mirror 2401. The variable index material in the rearview mirror 2401 activates and changes the field of view of the mirror 2401. Alternatively, the controller 2400 may be programmed to adjust both the side and rearview mirrors in response to a signal from the sensor 2402. For example, either or both side view mirrors may change their fields of view, depending upon whether an object is in the drivers blind spot. Additionally, the actual field of view in the rearview mirror and the field of view available through the rear window of the motor vehicle may be changed, as necessary.

In another example, the driver activates the left turn signal or right turn signal. The corresponding signal input 2420, 2419 feeds into the controller 2400. The controller 2400 generates an electrical or other signal and sends it to the rearview mirror 2401 which then changes its field of view so that the driver can more easily see whether there are any vehicles in direct proximity to him and the direction in which he anticipates turning. As discussed previously, the controller 2400 may be programmed to adjust both the side and rear view mirrors in response to a signal input 2419, 2420. Alternatively, the range detector 2411 could be coupled with the left and right turn signal inputs 2420, 2419 to send a signal to the controller 2400 only when both the turn signal is activated and an object is detected in the driver's blind spot. In this operation, the mirrors' field of view only changes where there are, in fact, vehicles in direct proximity.

Likewise, without direct driver input, the steering wheel itself feeds a signal 2417 and 2418 to the controller 2400 when the steering wheel turns more than a predetermined number of degrees from its position at which the vehicle moves in a straight direction. The controller 2400 then sends a signal to the appropriate side view mirror 2413, which then modifies its field of view.

It is to be understood that other such combinations used to activate the mirrors and to reveal the driver's blind spot are possible and considered within the scope of the present invention.

An exemplary power range of the mirror assemblies in the vehicle application is −0.5 to −5.0 diopters, particularly −0.75 to −2.0 diopters. This power range is comparable to that of traditional spherical mirrors presently used in many commercial vehicle mirrors.

Generally, the power range of the present invention will depend on the application. For example, for a magnifying mirror, the power range could be from +0.5 to +6.0 diopters, where when used for cosmetics application or shaving, the range could be from +1.0 to +3.0 diopters.

The mechanisms and methods of the present invention may be implemented using a general-purpose microprocessor programmed according to the teachings of the present invention. The present invention thus also includes a machine readable medium, which may include instructions, which may be used to program a processor to perform a method according to the present invention. This medium may include, but is not limited to, any type of disk including floppy disk, optical disk, and CD-ROMS.

Figure 25:
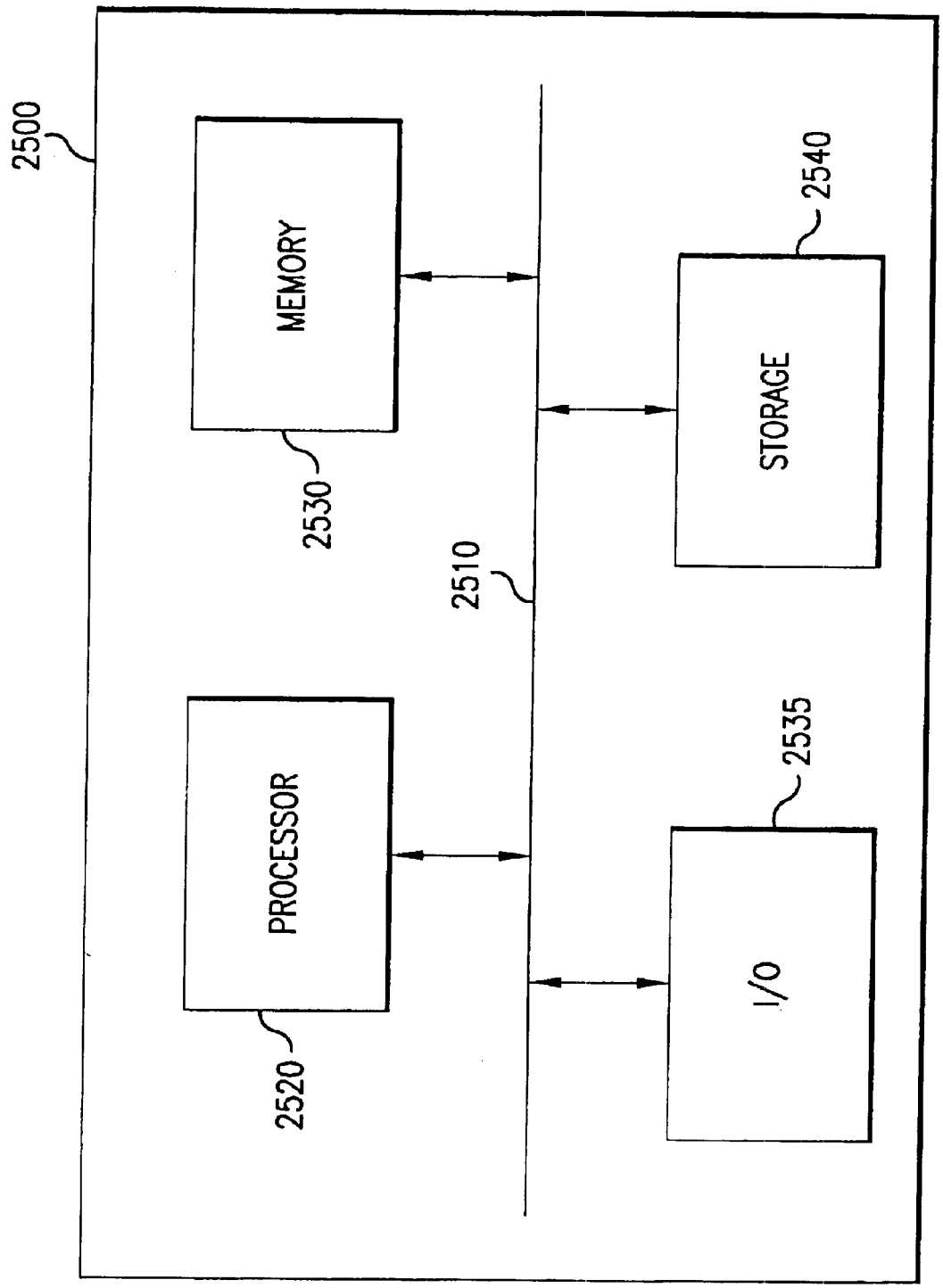
FIG. 25 shows an exemplary computer system for implementing a controller of the present invention.

FIG. 25 is a block diagram of one embodiment of a computer system that can implement the controller of the present invention. The system 2500 may include, but is not limited to, a bus 2510 in communication with a processor 2520, a system memory module 2530, an I/O device 2535 to receive signal inputs and to send control signals to the mirrors, and a storage device 2540 according to embodiments of the present invention to include the instructions performed by the controller.

It is to be understood that the structure of the software used to implement the invention may take any desired form, such as a single or multiple programs. It is to be further understood that the method of the present invention may be implemented by software, hardware, or a combination thereof.

While various embodiments of the present invention have been presented above, other embodiments also in accordance with the same spirit and scope of the present invention are also plausible.

What is claimed is:

1. A focusing mirror assembly comprising:
   a non-opaque variable index material alterable between at least two different indices of refraction, wherein the index of refraction of the variable index material is altered when the variable index material is exposed to an electrical stimulus;
   at least one activation layer in communication with the variable index material comprising the electrical stimulus as individually addressable regions; and
   a mirror in optical communication with the variable index material, the mirror positioned to reflect radiation waves passing through the non-opaque variable index material.

2. The mirror assembly of claim 1 wherein the non-opaque variable index material is configured to focus radiation waves passing through the non-opaque variable index material.

3. A focusing mirror assembly comprising:
   a non-opaque variable index material alterable between at least two different indices of refraction;
   at least one activation layer, the activation layer in communication with the variable index material, the activation layer containing individually addressable regions; and
   a mirror in optical communication with the variable index material, the mirror positioned to reflect radiation waves passing through the non-opaque variable index material.

4. The focusing mirror assembly of claim 3 wherein the individually addressable regions are activated by activation voltages.

5. The focusing mirror assembly of claim 4 wherein the index of refraction of the variable index material associated with an individually addressable region of the plurality of individually addressable regions varies with the magnitude of the applied activation voltage.

6. The focusing mirror assembly of claim 3 wherein the individually addressable regions form concentric loops.

7. The focusing mirror assembly of claim 3 wherein the individually addressable regions form an array of pixelated regions.

8. The focusing mirror assembly of claim 3 wherein the individually addressable regions are hexagonally shaped.

9. The focusing mirror assembly of claim 3 wherein a contained filament or heating layer is activated to generate thermal energy.

10. The focusing mirror assembly of claim 3 wherein the activation layer is located within an optically transmissive container.

11. The mirror assembly of claim 3 wherein the non-opaque variable index material is configured to focus radiation waves passing through non-opaque variable index material.

12. A mirror assembly comprising:
   a non-opaque variable index material alterable between at least two different indices of refraction;
   at least one activation layer in communication with the variable index material, the activation layer containing individually addressable regions; and
   a mirror in optical communication with the variable index material, the mirror positioned to reflect radiation waves passing through the non-opaque variable index material,
   wherein the variable index material is at least partially located within an optically transmissive container,
   wherein the optically transmissive container defines a void containing at least part of the variable index material,
   wherein the void in the optically transmissive container forms the shape of a lens.

13. The mirror assembly of claim 12 wherein the non-opaque variable index material is configured to focus radiation waves passing through the non-opaque variabl index material.

14. A mirror assembly comprising:
   a non-opaque variable index material alterable between at least two indices of refraction; and
   a mirror in optical communication with the variable index material, the mirror positioned to reflect radiation waves passing through the non-opaque variable index material, wherein the variable index material is at least partially located within an optically transmissive container, wherein the optically transmissive container defines a void containing at least part of the variable index material, wherein a surface of the void in the optically transmissive container defines a patterned cross-sectional profile.

15. The mirror assembly of claim 14 wherein the patterned cross-sectional profile forms a Fresnel lens.

16. The mirror assembly of claim 14 wherein the non-opaque variable index material is configured to focus radiation waves passing through the non-opaque variable index material.

17. A mirror assembly comprising:

a non-opaque variable index material alterable between at least two different indices of refraction;

at least one activation layer in communication with the variable index material, the activation layer containing individually addressable regions; and a mirror in optical communication with the variable index material, the mirror positioned to reflect radiation waves passing through the non-opaque variable index material, wherein the variable index material is at least partially located within an optically transmissive container, wherein an outside surface of the optically transmissive container defines a concave or convex surface.

18. The mirror assembly of claim 17 wherein the non-opaque variable index material is configured to focus radiation waves passing through the non-opaque variable index material.

19. A mirror assembly comprising:

a non-opaque variable index material alterable between at least two different indices of refraction;

a diffractive pattern layer, the diffractive pattern layer in optical communication with the variable index material; and a mirror in optical communication with the variable index material, the mirror positioned to reflect radiation waves passing through the non-opaque variable index material.

20. The mirror assembly of claim 19 wherein the non-opaque variable index material is configured to focus radiation waves passing through the non-opaque variable index material.

21. A mirror system comprising:

an optically transmissive container;

a variable index material in optical communication with the optically transmissive container, the variable index material alterable between at least two different indices of refraction;

a mirror in optical communication with the variable index material;

a controller, the controller infuencing the index of refraction of the variable index naterial, the controller controlling individually addressable regions of the variable index material; and a sensor, in communication with the controller, the controller adapted to influence the index of refraction of the variable index material in response to signals received from the sensor.

22. The mirror system of claim 21, wherein the sensor is calibrated to detect the location of a nearby motor vehicle.

23. The mirror system of claim 21 wherein the controller is adapted to generat a signal to modify the index of refraction of the variable index material to be greater than the index of refraction of the optically transmissive container when it receives a signal from the sensor indicating the detection of a nearby motor vehicle.

24. The mirror system of claim 21 wherein the controller is located within a carrier motor vehicle and wherein the controller is adapted to adjust the sensing range of sensor using a characteristic of a driver of the carrier motor vehicle.

25. The mirror system of claim 24 wherein the characteristic of the driver includes one of the driver's height of eye, the driver's seat position, and the driver's mirror setting.

26. The mirror system of claim 21 wherein the the controller is located within a carrier motor vehicle and wherein the controller is adapted to adjust the calibration of the sensor based upon the speed of the carrier motor vehicle.

27. The mirror system of claim 21 wherein the sensor is in communication with a turning indicator of the carrier motor vehicle.

28. The mirror system of claim 21 wherein the sensor is in communication with the steering wheel of the carrier motor vehicle.

29. The mirror system of claim 21 wherein the sensor is positioned to detect the location of an individual.

30. The mirror system of claim 21 wherein the variable index material is configured to focus radiation waves reflected off of the mirror.

31. A mirror system comprising:

an optically transmissive container;

a variable index material in optical communication with the optically transmissive container, the variable index material alterable between at least two different indices of refraction;

a mirror in optical communication with the variable index material;

a controller, the controller influencing the index of refraction of the variable index material; and a sound generator, the sound generator in communication with the controller.

32. The mirror system of claim 31 wherein the controller is adapted to activate the sound generator when the controller receives a signal from the sensor regarding the location of a near motor vehicle.

33. The mirror system of claim 31 wherein the variable index material is configured to focus radiation waves reflected off of the mirror.

34. A mirror system comprising:

an optically transmissive container;

a variable index material in optical communication with the optically transmissive container, the variable index material alterable between at least two different indices of refraction;

a mirror in optical communication with the variable index material;

a controller, the controller influencing the index of refraction of the variable index material; and a warning light in communication with the controller.

35. The mirror system of claim 34 wherein the controller is adapted to activate the warning light when the controller receives a signal from the sensor regarding the location of a nearby motor vehicle.

36. The mirror system of claim 35 wherein control signals generated by the controller may be overridden by a manual override.

37. The mirror system of claim 34 wherein the variable index material is configured to focus radiation waves reflected off of the mirror.

38. A method of modifying the reflective properties of a mirror assembly comprising:
   sensing the presence of an object;
   generating a signal;
   exposing a material to an electromagnetic field in order to modify the material's index of refraction;
   sensing the position of a driver of a carrier motor vehicle; and
   sensing the speed of the carrier motor vehicle.

39. The method of claim 38 wherein the material is configured to focus radiation waves reflected off of the mirror.

40. A mirror assembly comprising:
   a non-opaque variable index material alterable between at least two different indices of refraction, wherein the index of refraction of the variable index material is altered when the variable index material is exposed to an electrical stimulus;
   at least one activation layer in communication with the variable index material, the activation layer comprising the electrical stimulus as individually addressable regions; and
   a mirror in optical communication with the variable index material,
   the mirror positioned to reflect radiation waves passing through the non-opaque variable index material,
   the radiation waves, traveling from the non-opaque variable index material towards the mirror, traveling that distance without passing through a polarization device.

41. The mirror assembly of claim 40 wherein the radiation waves reflected off of the mirror and traveling towards the non-opaque variable index device travel that distance without passing through a polarization device.

42. The mirror assembly of claim 40 wherein the individually addressable regions are activated by activation voltages.

43. The mirror assembly of claim 42 wherein the index of refraction of the variable index material associated with an individually addressable region of the plurality of individually addressable regions varies with the magnitude of the applied activation voltage.

44. The mirror assembly of claim 40 wherein the individually addressable regions form concentric loops.

45. The mirror assembly of claim 40 wherein the individually addressable regions form an array of pixelated regions.

46. The mirror assembly of claim 40 wherein the individually addressable regions are hexagonally shaped.

47. The mirror assembly of claim 40 further comprising a heating layer in communication with the variable index material.

48. The mirror assembly of claim 40 wherein the activation layer is located within an optically transmissive container.

49. A method of modifying the refractive properties of a focusing mirror assembly comprising:
   generating a signal at a sensor;
   exposing a material to an electromagnetic field in order to modify the material's index of refraction in individually addressable regions of the material in response to the signal; and
   altering the pathway of a lightwave moving through the mirror assembly.

50. The method of claim 49 further comprising:
   controlling the strength of the electromagnetic field in the individually addressable regions.

* * * * *

UNITED STATES PATENT AND TRADEMARK OFFICE
CERTIFICATE OF CORRECTION

PATENT NO. : 6,927,894 B2
DATED : August 9, 2005
INVENTOR(S) : Ronald D. Blum et al.

It is certified that error appears in the above-identified patent and that said Letters Patent is hereby corrected as shown below:

Column 18,
Line 59, change "variabl" to -- variable --.

Column 19,
Line 56, change "infuencing" to -- influencing --.
Line 57, change "naterial" to -- material --.
Line 67, change "generat" to -- generate --.

Column 20,
Line 13, after "wherein" delete "the" (second occurrence).

Signed and Sealed this

Twenty-ninth Day of November, 2005

JON W. DUDAS
*Director of the United States Patent and Trademark Office*